(12) United States Patent
Nakada et al.

(10) Patent No.: US 8,411,380 B2
(45) Date of Patent: Apr. 2, 2013

(54) LENS BARREL

(75) Inventors: Toshiyuki Nakada, Osaka (JP); Tetsuya Uno, Osaka (JP)

(73) Assignee: Panasonic Corporation, Osaka (JP)

( * ) Notice: Subject to any disclaimer, the term of this patent is extended or adjusted under 35 U.S.C. 154(b) by 67 days.

(21) Appl. No.: 13/185,504

(22) Filed: Jul. 19, 2011

(65) Prior Publication Data
US 2012/0019939 A1    Jan. 26, 2012

(30) Foreign Application Priority Data

Jul. 20, 2010 (JP) .................................. 2010-163017
Jul. 14, 2011 (JP) .................................. 2011-155643

(51) Int. Cl.
*G02B 7/02* (2006.01)
(52) U.S. Cl. ..................... 359/819; 348/373; 396/448
(58) Field of Classification Search .............. 359/819, 359/892, 694–704; 396/72–75, 79, 267, 396/282, 284–295, 349, 376, 448, 535; 348/373, 348/E5.026, E5.028, E5.046
See application file for complete search history.

(56) References Cited

U.S. PATENT DOCUMENTS

| | | | | |
|---|---|---|---|---|
| 5,708,535 A | * | 1/1998 | Orimo et al. | 359/823 |
| 6,002,437 A | * | 12/1999 | Morioka et al. | 348/373 |
| 6,665,455 B1 | * | 12/2003 | Ting | 382/312 |

FOREIGN PATENT DOCUMENTS

| | | |
|---|---|---|
| JP | S63-166293 A | 7/1988 |
| JP | H11-218669 A | 8/1999 |
| JP | 2004-163748 A | 6/2004 |

* cited by examiner

*Primary Examiner* — Loha Ben
(74) *Attorney, Agent, or Firm* — Shinjyu Global IP

(57) ABSTRACT

A lens barrel is provided that includes an optical system, a housing, a cover member, an electronic part, a flexible substrate. The optical system is configured to form an optical image of a subject. The housing supports the optical system in an interior. The cover member supports the housing in a state of covering an opening of the housing. The electronic part is provided in the interior of the housing. The flexible substrate is electrically connected to the electronic part. The flexible substrate has a connection terminal. The cover member has a through-hole formed in a specific direction. The connection terminal is positioned on inside of the through-hole when viewed in the specific direction.

10 Claims, 27 Drawing Sheets

LENS BARREL

CROSS-REFERENCE TO RELATED APPLICATIONS

This application claims priority to Japanese Patent Application No. 2010-163017 filed on Jul. 20, 2010 and Japanese Patent Application No. 2011-155643 filed on Jul. 14, 2011. The entire disclosure of Japanese Patent Application No. 2010-163017 and Japanese Patent Application No. 2011-155643 is hereby incorporated herein by reference.

BACKGROUND

1. Technical Field

The technology disclosed herein relates to a lens barrel equipped with a flexible substrate for connecting an electronic part inside the housing to an external member.

2. Description of the Related Art

There was known in the past a lens barrel equipped with a flexible substrate for connecting an electronic part inside the housing to an external member.

Japanese Laid-Open Patent Application 2004-163748 discloses a constitution in which a flexible substrate is passed through a hole provided to a mounting component.

SUMMARY

The work entailed by threading the flexible substrate through the hole is troublesome and results in diminished work efficiency.

The technology disclosed herein was conceived in light of the above problem, and it is an object thereof to provide a lens barrel with which an electrical connection between an electronic part inside the housing and an external member can be easily made.

The stated object can be accomplished by the following lens barrel. The lens barrel includes an optical system, a housing, a cover member, an electronic part, a flexible substrate. The optical system is configured to form an optical image of a subject. The housing supports the optical system in an interior. The cover member supports the housing in a state of covering an opening of the housing. The electronic part is provided in the interior of the housing. The flexible substrate is electrically connected to the electronic part. The flexible substrate has a connection terminal. The cover member has a through-hole formed in a specific direction. The connection terminal is positioned on inside of the through-hole when viewed in the specific direction.

The technology disclosed herein provides a lens barrel with which an electrical connection between the electronic part inside the housing and an external member can be easily made.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Simplified Configuration of Lens Barrel 100

Figure 1:
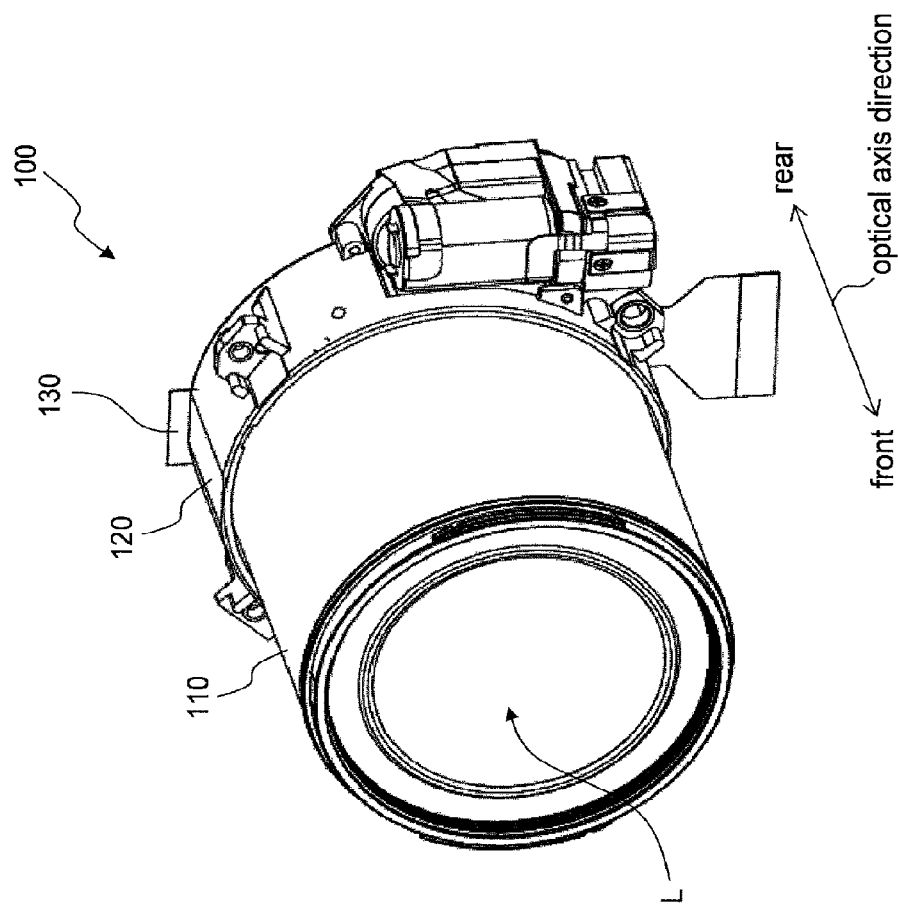
FIG. 1 is an oblique view of a lens barrel as seen from the front.
Figure 2:
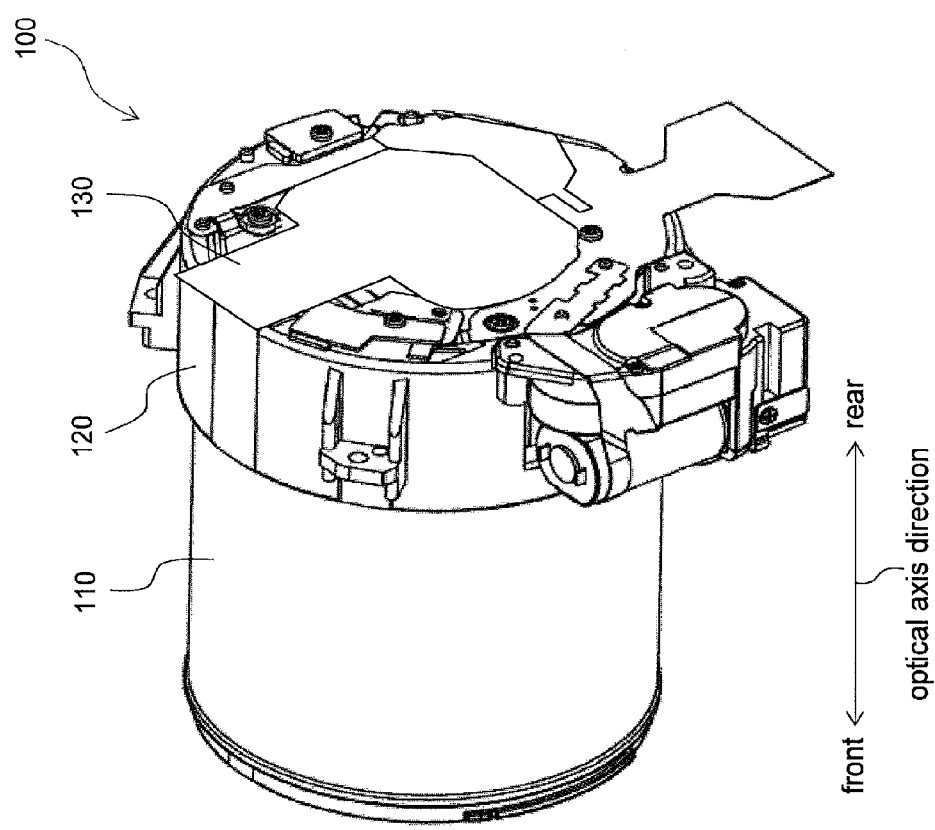
FIG. 2 is an oblique view of a lens barrel as seen from the rear.
Figure 3:
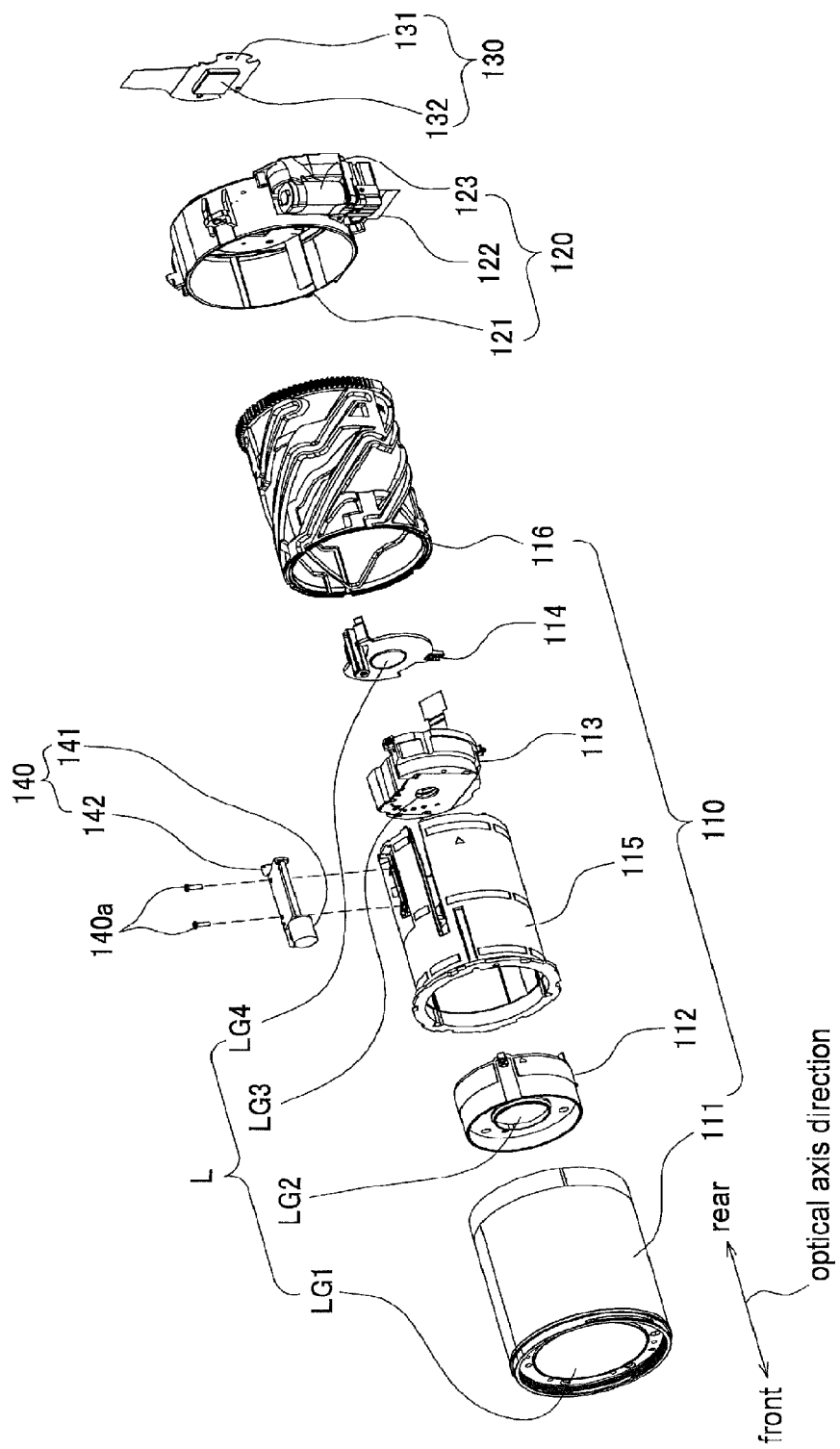
FIG. 3 is an exploded oblique view of a lens barrel.

The simplified configuration of the lens barrel 100 pertaining to an embodiment will be described through reference to the drawings. FIG. 1 is an oblique view of the lens barrel 100 as seen from the front. FIG. 2 is an oblique view of the lens barrel 100 as seen from the rear. FIG. 3 is an exploded oblique view of the lens barrel 100.

In this embodiment, "front" and "rear" are terms based on a camera (including a camera body and a lens barrel) that is facing a subject, with the subject side being referred to as the "front" and the opposite side from the subject the "rear."

As shown in FIGS. 1 to 3, the lens barrel 100 comprises an optical system L, a lens housing 110, a base member 120, an imaging element unit 130, and a monitor unit 140. The lens barrel 100 is a part of a camera (including an interchangeable type), and is mounted to a camera body that is not shown.

Optical System L

The optical system L forms an optical image of a subject on an imaging element 132 shown in FIG. 3. The optical system L is supported in the interior of the lens housing 110. As shown in FIG. 3, the optical system L has a first lens group LG1, a second lens group LG2, a third lens group LG3, and a fourth lens group LG4.

Lens Housing 110

The lens housing 110 supports the optical system L in its interior. The lens housing 110 has a cylindrical external shape. As shown in FIG. 1, a front side opening of the lens housing 110 is covered by the optical system L, and as shown in FIG. 2, a rear side opening of the lens housing 110 is covered by the base member 120. As shown in FIG. 3, the lens housing 110 has a first movement frame 111, a second movement frame 112, a third movement frame 113, a fourth movement frame 114, a fixed frame 115, and a rotary barrel 116.

The first movement frame 111 is a cylindrical member that holds other parts constituting the lens housing 110. The first movement frame 111 supports the first lens group LG1.

The second movement frame 112 is held in the interior of the fixed frame 115. The second movement frame 112 supports the second lens group LG2.

The third movement frame 113 is held to the rear of the second movement frame 112 in the interior of the fixed frame 115. The third movement frame 113 supports the third lens group LG3. The configuration of the third movement frame 113 will be described in detail below.

The fourth movement frame 114 is held to the rear of the third movement frame 113 in the interior of the fixed frame 115. The fourth movement frame 114 supports the fourth lens group LG4.

The fixed frame 115 is a cylindrical member that holds the second movement frame 112, the third movement frame 113, and the fourth movement frame 114. The fixed frame 115 supports the second movement frame 112, the third movement frame 113, and the fourth movement frame 114 so that they can move in the optical axis direction, and so that they do not rotate around the optical axis. The configuration of the fixed frame 115 will be described in detail below.

The rotary barrel 116 is a cylindrical member that holds the fixed frame 115. The rotary barrel 116 is able to rotate around the optical axis. The rotary barrel 116 has a plurality of cam grooves formed in its outer peripheral face. Cam followers of the first movement frame 111, the second movement frame 112, and the third movement frame 113 are engaged in these cam grooves, and the cam followers move through the respective cam grooves. Consequently, the first movement frame 111, the second movement frame 112, and the third movement frame 113 are each driven in the optical axis direction.

Base Member 120

The base member 120 supports the rear end of the lens housing 110. As shown in FIG. 3, the base member 120 has a cover main body 121, a base substrate 122, and a DC motor 123.

The cover main body 121 is cup-shaped externally. The cover main body 121 is screwed down in a state of being fitted to the rear end of the lens housing 110.

The base substrate 122 is a flexible substrate that has the flexibility. Wiring is formed on inside and outside of the base substrate 122. The base substrate 122 is disposed on the rear side of the cover main body 121 (that is, the opposite side from the side on which the lens housing 110 is supported). The base substrate 122 is electrically connected to a flexible substrate 142 of the monitor unit 140 shown in FIG. 3, and to a controller of the camera body (not shown). The base substrate 122 transmits the electrical signals outputted by the camera body controller to the flexible substrate 142.

The DC motor 123 is fixed to the outer periphery of the cover main body 121. The DC motor 123 rotationally drives the rotary barrel 116. The DC motor 123 is an example of an actuator. A DC motor, a stepping motor, an ultrasonic motor featuring a piezoelectric element, or the like can be used as this actuator, for example.

The configuration of the base member 120 will now be described in detail.

Imaging Element Unit 130

The imaging element unit 130 is disposed on the rear side of the base member 120. As shown in FIG. 3, the imaging element unit 130 has a support plate 131 and the imaging element 132.

The support plate 131 supports the imaging element 132. The support plate 131 is fixed to the rear face of the base member 120.

The imaging element 132 produces image data by capturing the optical image of a subject that is formed by the optical system L. The imaging element 132 can be a CMOS image sensor, a CCD image sensor, or the like, for example.

Monitor Unit 140

The monitor unit 140 is fixed to the side face of the fixed frame 115 by a pair of screws 140a. As shown in FIG. 3, the monitor unit 140 has a stepping motor 141 and the flexible substrate 142.

The stepping motor 141 drives the fourth movement frame 114 in the optical axis direction. More specifically, the fourth movement frame 114 engaged with the lead screw (not shown) of the stepping motor 141 is driven forward and backward according to the rotation of the lead screw. The monitor unit 140 is an example of an actuator. A DC motor, a stepping motor, an ultrasonic motor featuring a piezoelectric element, or the like can be used as this actuator, for example.

The flexible substrate 142 is a resin substrate having wiring formed on its inner and outer surfaces. The flexible substrate 142 is electrically connected to the base substrate 122 and the stepping motor 141, as will be discussed below. The flexible substrate 142 transmits electrical signals inputted from the base substrate 122 to the stepping motor 141.

Figure 4:
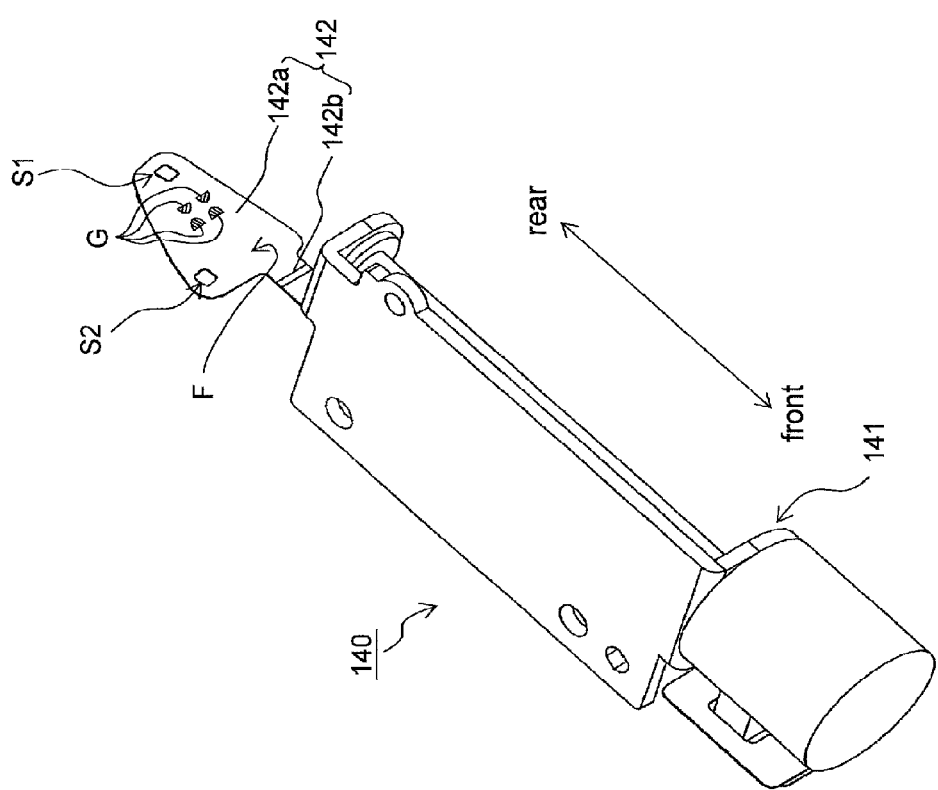
FIG. 4 is an oblique view of the configuration of a monitor unit.

Here, FIG. 4 is an oblique view of the configuration of the monitor unit 140. As shown in FIG. 4, the flexible substrate 142 is made up of a connection component 142a and a communicating component 142b.

The connection component 142a is formed as a thin sheet. The connection component 142a constitutes the rear end of the flexible substrate 142, and sticks out rearward from the rear end of the stepping motor 141. The connection component 142a has a connection face F, four connection terminals a first fitting hole S1, and a second fitting hole S2. The connection face F is one main face of the connection component 142a. The four connection terminals G are made up of solder, and are disposed on the connection face F. The first fitting hole S1 and the second fitting hole S2 each pass through the connection component 142a.

The communicating component 142b is pliant and is narrower than the connection component 142a. The communicating component 142b pivotably supports the connection component 142a. The communicating component 142b allows the connection component 142a to communicate with the stepping motor 141, and electrically connects the connection component 142a and the stepping motor 141.

The step of attaching the flexible substrate 142 to the fixed frame 115 will be discussed below.

Detailed Configuration of Third Movement Frame 113

Figure 5:
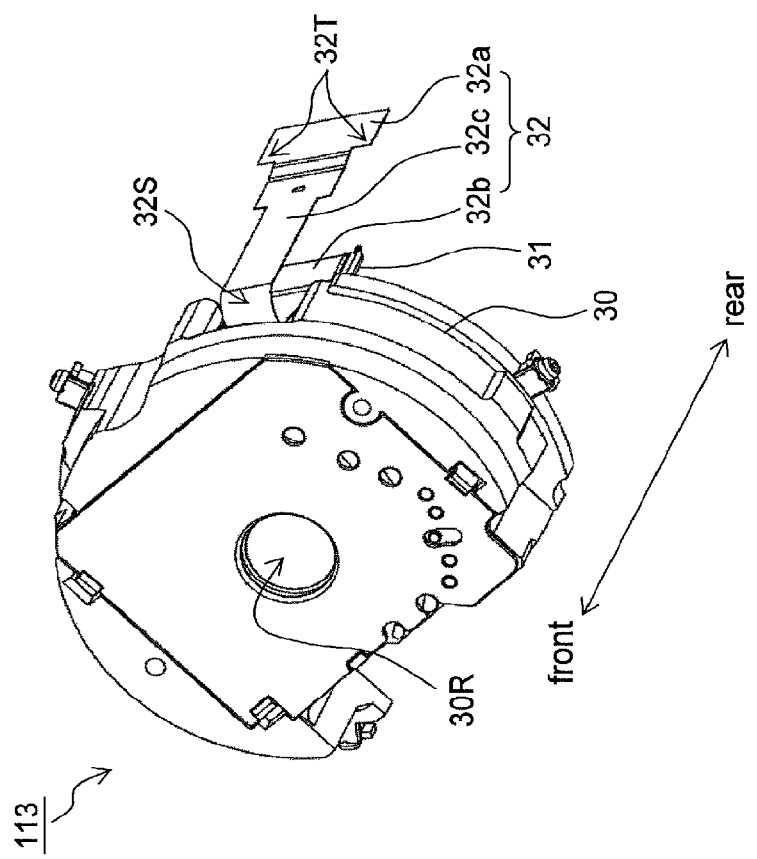
FIG. 5 is an oblique view of a third movement frame as seen from the front.
Figure 6:
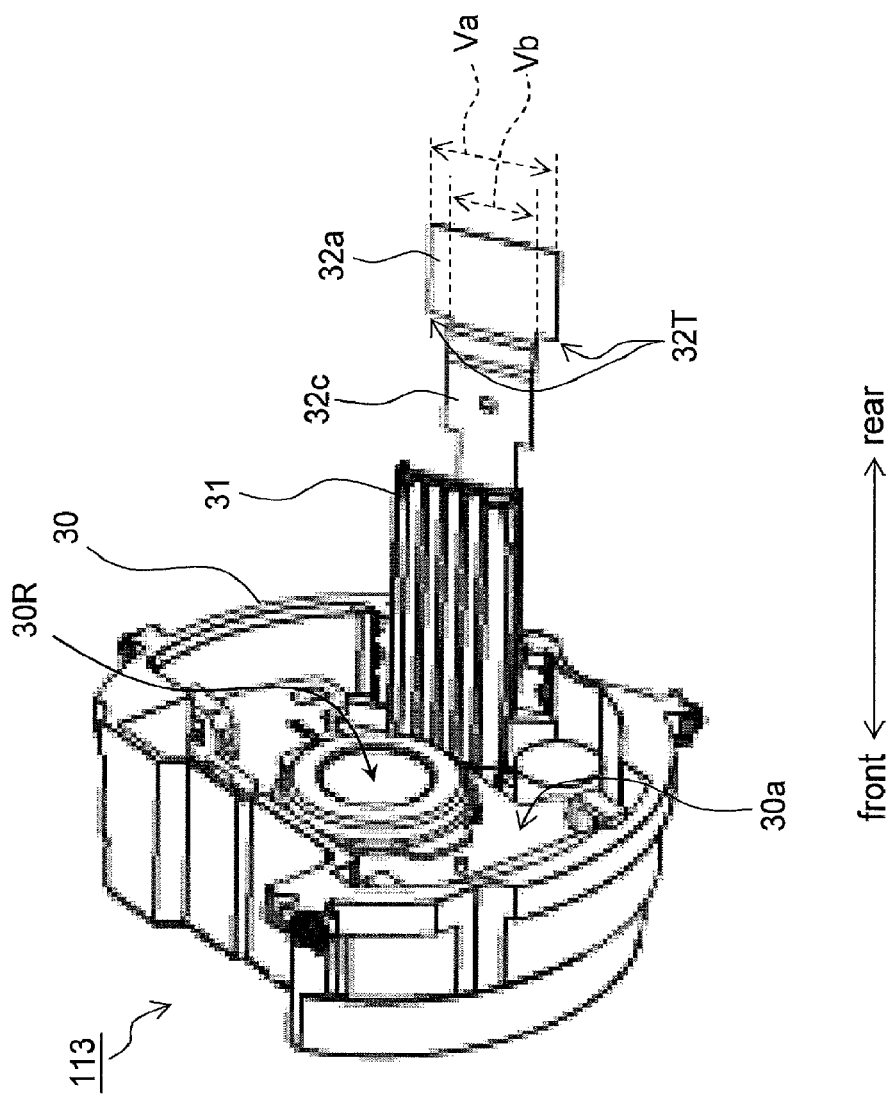
FIG. 6 is an oblique view of a third movement frame as seen from the rear.

Next, the detailed configuration of the third movement frame 113 will be described through reference to the drawings. FIG. 5 is an oblique view of the third movement frame 113 as seen from the front. FIG. 6 is an oblique view of the third movement frame 113 as seen from the rear.

The third movement frame 113 has a frame main body 30, a supporting wall 31, and flexible printed circuits (FPC) 32.

The frame main body 30 is cup-shaped externally. A fitting hole 30R for fitting the third lens group LG3 is formed on the inner bottom face 30a of the frame main body 30.

As shown in FIG. 6, the supporting wall 31 is erected on the inner bottom face 30a. The supporting wall 31 is disposed in the longitudinal direction (that is, the optical axis direction). The supporting wall 31 sticks out to the rear from the frame main body 30.

As shown in FIG. 5, the FPC 32 is made up of a reinforcing plate 32a, a fixed component 32b, and a linking component 32c. Wiring is formed on inside and on the surface of the reinforcing plate 32a, the fixed component 32b, and the linking component 32c.

The reinforcing plate 32a is the free end located farther to the rear than the supporting wall 31. The fixed component 32b is fixed to the outer face of the supporting wall 31. The fixed component 32b is located closer to the frame main body 30 than the reinforcing plate 32a. The linking component 32c is linked to the reinforcing plate 32a and the fixed component 32b. The linking component 32c is more pliant than the reinforcing plate 32a, and includes a curved part 32S that forms a shape that protrudes forward. The linking component 32c gently bends at the curved part 32S.

As shown in FIG. 6, the width va of the reinforcing plate 32a is greater than the width vb of the linking component 32c. Consequently, a pair of shoulders 32T that protrude to both sides of the linking component 32c are formed at the front end of the reinforcing plate 32a.

Although not depicted, the third movement frame 113 has built into it a shutter mechanism, an image blur correction mechanism, and an aperture mechanism, and the actuators of the various mechanisms are electrically connected to the FPC 32. Also, as discussed below, the FPC 32 is connected to the base substrate 122 and transmits the electrical signals inputted from the base substrate 122 to the actuators of the various mechanisms. This executes shutter operation, image blur correction operation, and aperture operation.

Detailed Configuration of Fixed Frame 115

Figure 7:
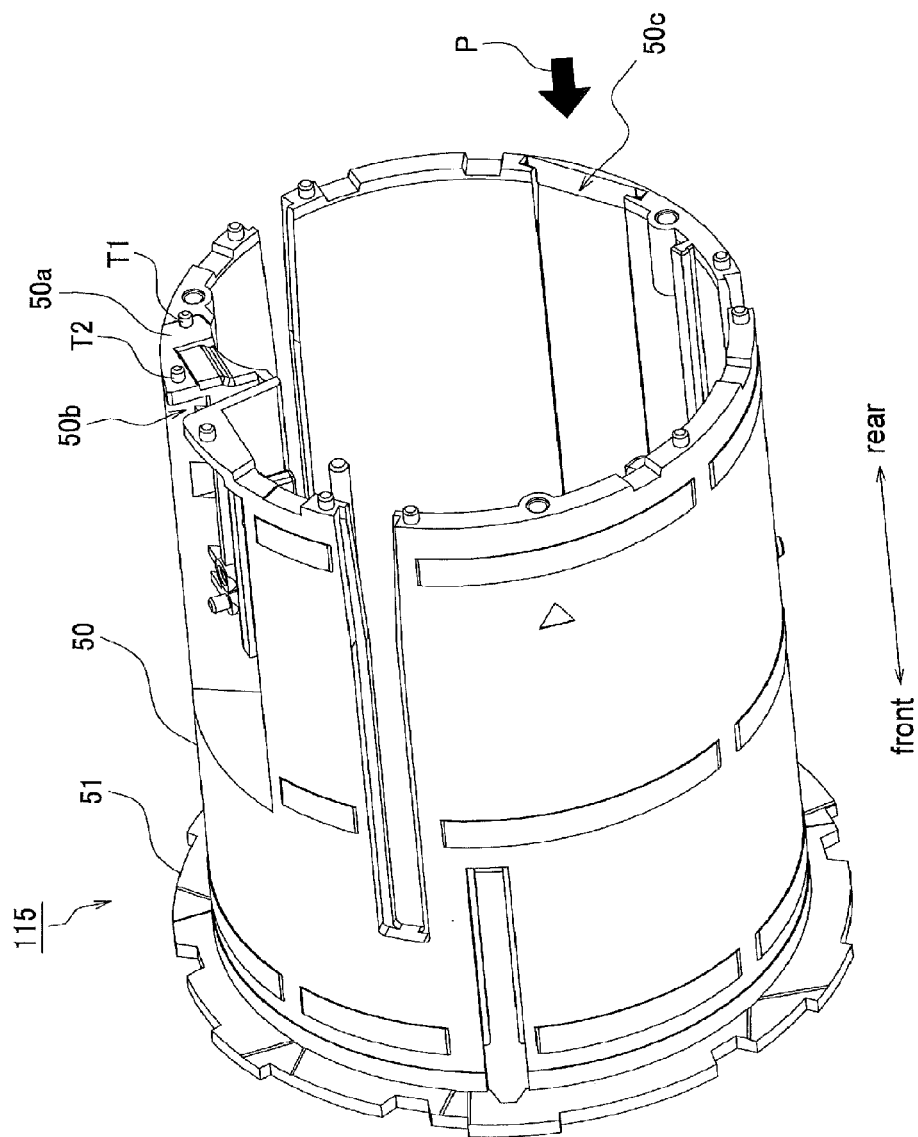
FIG. 7 is an oblique view of a fixed frame as seen from the rear.

Next, the detailed configuration of the fixed frame 115 will be described through reference to the drawings. FIG. 7 is an oblique view of the fixed frame 115 as seen from the rear.

The fixed frame 115 has a cylindrical component 50 and a flange 51 that leads to the front end of the cylindrical component 50.

The cylindrical component 50 is formed in a cylindrical shape, and forms a space in its interior that accommodates the second movement frame 112, the third movement frame 113, and the fourth movement frame 114. The cylindrical component 50 has a support base 50a, a cut-out 50b, and an engagement component 50c.

The support base 50a is formed at the rear end of the cylindrical component 50. The support base 50a is provided in order to support the connection component 142a part of the flexible substrate 142 had by the monitor unit 140. The support base 50a has a first support boss T1 and a second support boss T2. The first and second support bosses T1 and T2 are each formed in a cylindrical shape. The outside diameters of the first and second support bosses T1 and T2 respectively correspond to the first and second fitting holes S1 and S2 had by the connection component 142a of the flexible substrate 142.

In this embodiment, the first and second support bosses T1 and T2 are disposed on inside of a through-hole 127 formed in the base member 120, as discussed below (see FIG. 24). The positional relation between the first and second support bosses T1 and T2 and the through-hole 127 will be described in conjunction with the description of the step of assembling the lens barrel 100.

The cut-out 50b is provided adjacent to the support base 50a. The communicating component 142b of the flexible substrate 142 had by the monitor unit 140 is inserted into the cut-out 50b as discussed below.

Figure 8:
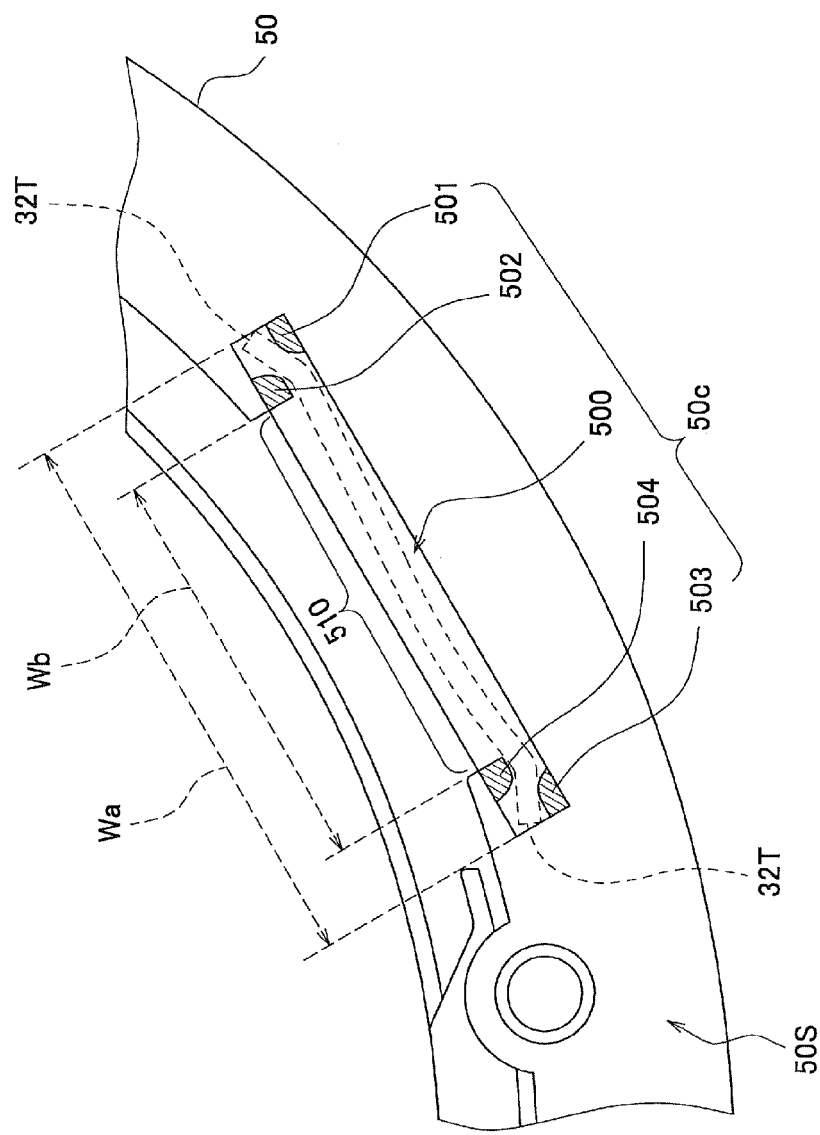
FIG. 8 is a detail view of a portion of the fixed frame as seen in the direction of the arrow P in FIG. 7.

The engagement component 50c is formed at the rear end of the cylindrical component 50. FIG. 8 is a detail view of a portion of the fixed frame 115 as seen in the direction of the arrow P in FIG. 7. As shown in FIG. 8, the engagement component 50c is formed at the rear end face 50S of the cylindrical component 50 (that is, the end face that is opposite the base member 120).

The engagement component 50c has a slit 500, a slit opening 510, and first to fourth protrusions 501 to 504. The engagement component 50c is a cut-out which is formed at the rear end face 50S of the engagement component 50c. The slit opening 510 opens from the slit 500 into the interior of the cylindrical component 50. The width wa of the slit 500 is greater than the width wb of the slit opening 510. The width wa of the slit 500 is greater than the width va of the reinforcing plate 32a of the FPC 32 (see FIG. 6), and the width wb of the slit opening 510 is greater than the width vb of the linking component 32c of the FPC 32 (see FIG. 6). The first to fourth protrusions 501 to 504 are disposed inside the slit 500. The first protrusion 501 is disposed diagonally across from the second protrusion 502, and the third protrusion 503 is disposed diagonally across from the fourth protrusion 504. The pair of the first and second protrusions 501 and 502, and the pair of the third and fourth protrusions 503 and 504 each hold one of the two shoulders 32T of the FPC 32 in a bent state (indicated by the broken lines in FIG. 8).

Detailed Configuration of Base Member 120

Figure 9:
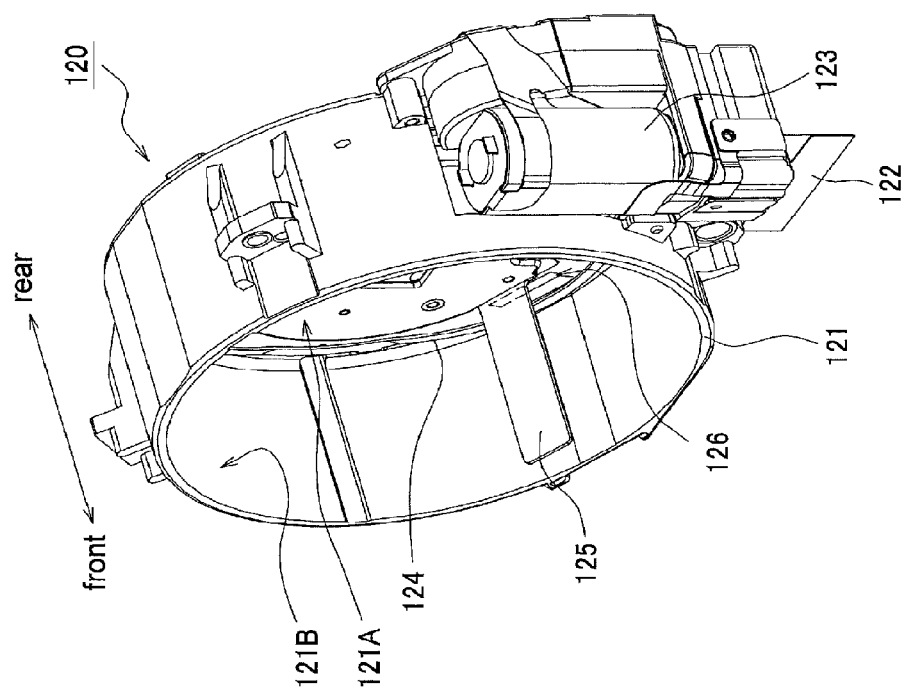
FIG. 9 is an oblique view of a base member as seen from the front.
Figure 10:
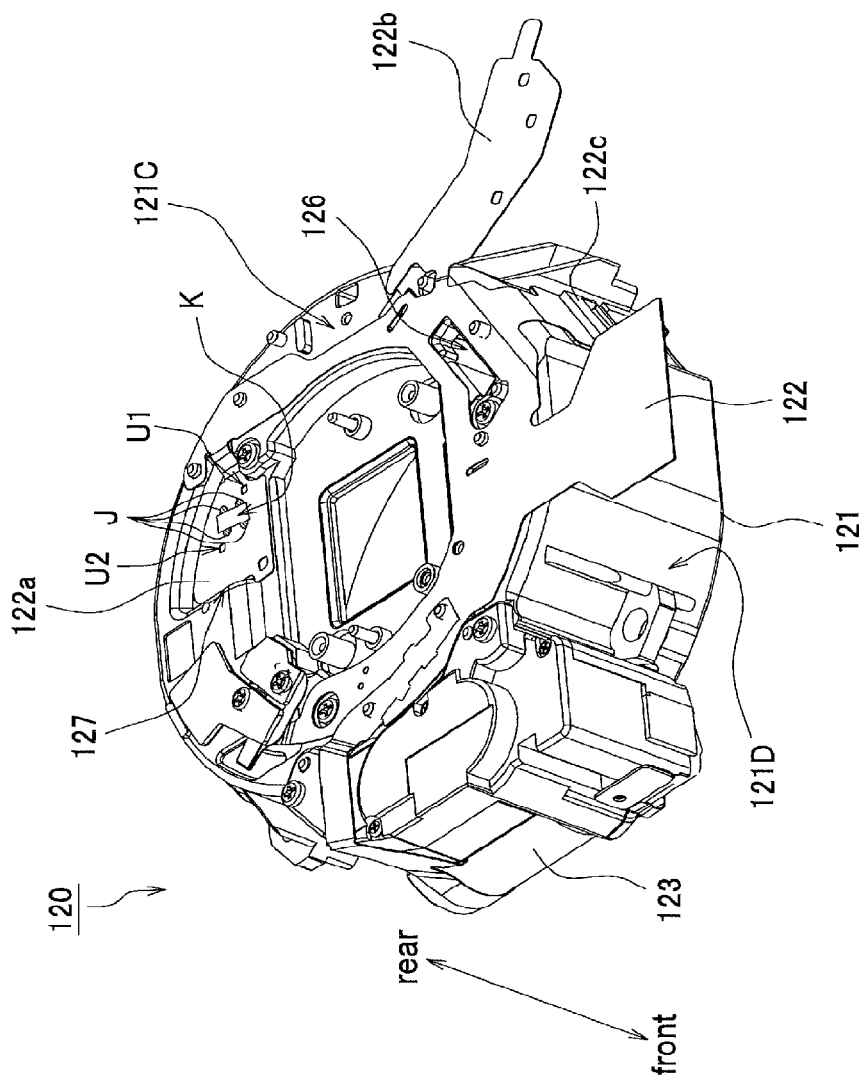
FIG. 10 is an oblique view of a base member as seen from the rear.

The detailed configuration of the base member 120 will now be described through reference to the drawings. FIG. 9 is an oblique view of the base member 120 as seen from the front. FIG. 10 is an oblique view of the base member 120 as seen from the rear.

As shown in FIGS. 9 and 10, the base member 120 has a ring spring 124, a guide wall 125, a guide hole 126, and the through-hole 127 in addition to the above-mentioned cover main body 121, the base substrate 122, and the DC motor 123.

As shown in FIGS. 9 and 10, the cover main body 121 as an inner bottom face 121A, an inner peripheral face 121B, an outer surface 121C, and an outer peripheral face 121D. The inner bottom face 121A is across from the rear end face of the lens housing 110. The inner peripheral face 121B surrounds the outer periphery of the rear end of the lens housing 110. The outer surface 121C is provided opposite the inner bottom face 121A. The outer peripheral face 121D is provided opposite the inner peripheral face 121B.

The ring spring 124 is formed by a flat metal member. The ring spring 124 is disposed along the inner peripheral face 121B on the inner bottom face 121A of the cover main body 121. The ring spring 124 is a biasing member that biases the rotary barrel 116 forward and thereby reduces looseness of the lens housing 110.

The guide wall 125 is erected on the inner bottom face 121A. The guide wall 125 is disposed in the longitudinal direction at a location close to the inner peripheral face 121B. The function of the guide wall 125 will be discussed below.

The guide hole 126 is formed in the optical axis direction. More specifically, the guide hole 126 passes through the cover main body 121 from the inner bottom face 121A all the way to the outer surface 121C in the optical axis direction. The guide hole 126 is formed between the ring spring 124 and the guide wall 125 in a plan view of the inner bottom face 121A. Since the FPC 32 of the third movement frame 113 is to be inserted into the guide hole 126, the guide hole 126 should have a size and shape that allow the insertion of the FPC 32.

The through-hole 127 is formed in the optical axis direction. More specifically, the through-hole 127 passes through the cover main body 121 from the inner bottom face 121A all the way to the outer surface 121C in the optical axis direction. The through-hole 127 is formed on inside of the ring spring 124 in a plan view of the inner bottom face 121A. The planar shape of the through-hole 127 corresponds to the external shape of the connection component 142a had by the flexible substrate 142. However, the through-hole 127 need only have a size and shape that allow access to the four connection terminals G of the connection component 142a (see FIG. 4), and may be smaller than the external shape of the connection face F of the connection component 142a.

As shown in FIG. 10, the base substrate 122 here has a connected component 122a, a cover 122b, and a connector 122c.

The connected component 122a is formed as a thin sheet. The connected component 122a is disposed in the through-hole 127, and substantially covers the through-hole 127. The connected component 122a has four connected terminals J, a connection window K, a first fitting hole U1, and a second fitting hole U2. The four connected terminals J consist of solder, and are disposed around the connection window K. The connection window K is a window that passes through the connected component 122a. The connection window K should have a size and shape corresponding to the four connection terminals G of the connection component 142a had by the flexible substrate 142 (see FIG. 4). The first fitting hole U1 and the second fitting hole U2 each pass through the connected component 122a. The first and second fitting holes U1 and U2 are formed corresponding to the first and second fitting holes S1 and S2 of the connection component 142a had by the flexible substrate 142.

The cover 122b is a cover for blocking off the guide hole 126. Blocking off the guide hole 126 with the cover 122b helps prevent dirt and so forth from working its way into the interior of the lens housing 110.

The connector 122c is disposed around the outer periphery of the base member 120. The reinforcing plate 32a of the FPC 32 is linked to the connector 122c.

Step of Assembling Lens Barrel 100

Next, the step of assembling the lens barrel 100 will be described through reference to the drawings. The following will be described below, in order: (1) attachment of the third movement frame 113 and the fourth movement frame 114 to the fixed frame 115, (2) attachment of the monitor unit 140 to the fixed frame 115, (3) attachment of the fixed frame 115 to the rotary barrel 116, (4) attachment of the base member 120 to the fixed frame 115, (5) connection of the FPC 32 to the base substrate 122, (6) connection of the flexible substrate 142 to the base substrate 122, and (7) attachment of the first movement frame 111 and the second movement frame 112 to the fixed frame 115.

(1) Attachment of Third Movement Frame 113 and Fourth Movement Frame 114 to Fixed Frame 115

Figure 11:
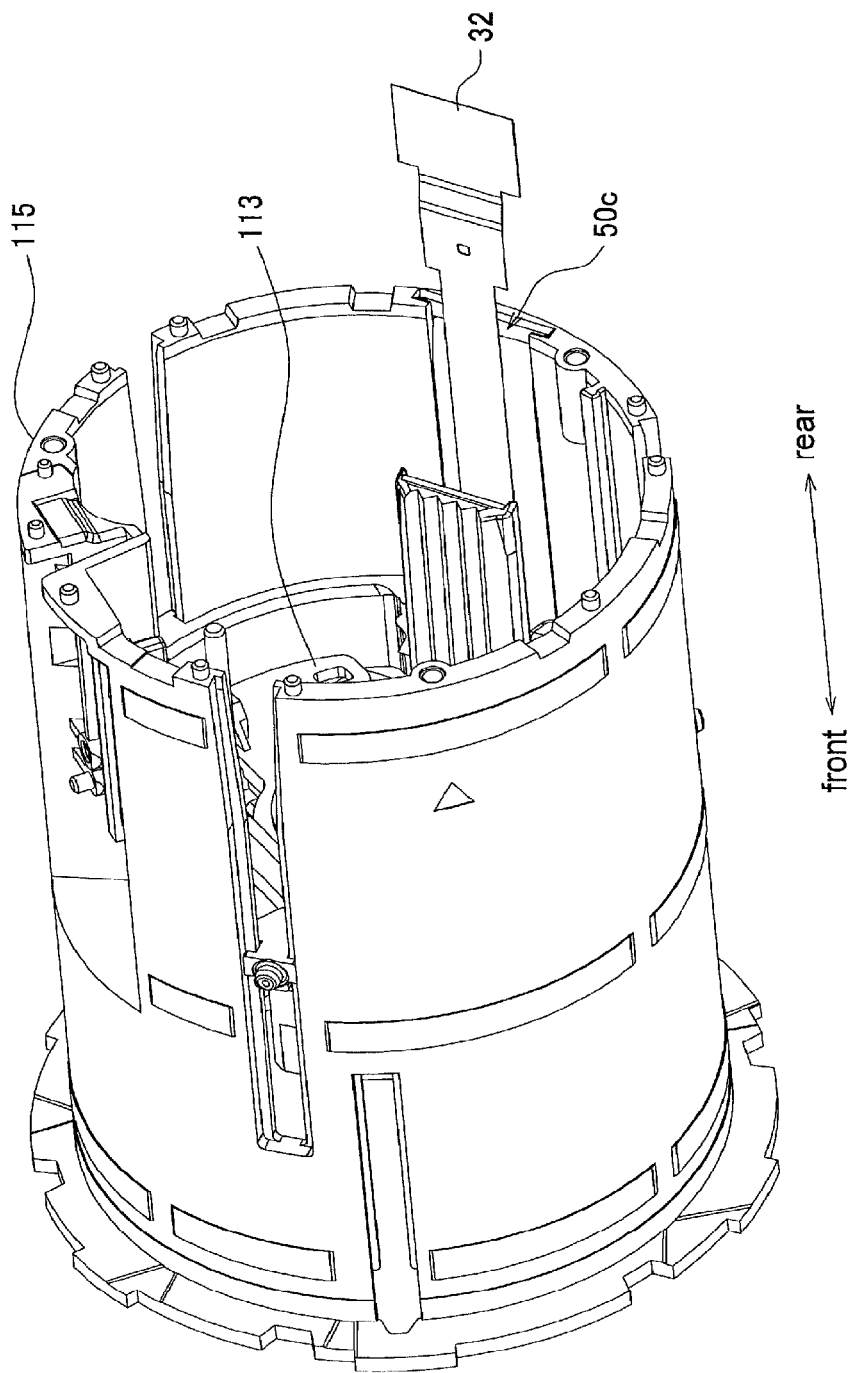
FIG. 11 is an oblique view illustrating a step of attaching a third movement frame to a fixed frame.

First, as shown in FIG. 11, the third movement frame 113 is inserted into the interior of the fixed frame 115 from the rear of the fixed frame 115. Here, the position of the FPC 32 of the third movement frame 113 is matched to the position of the engagement component 50c of the fixed frame 115.

Figure 12:
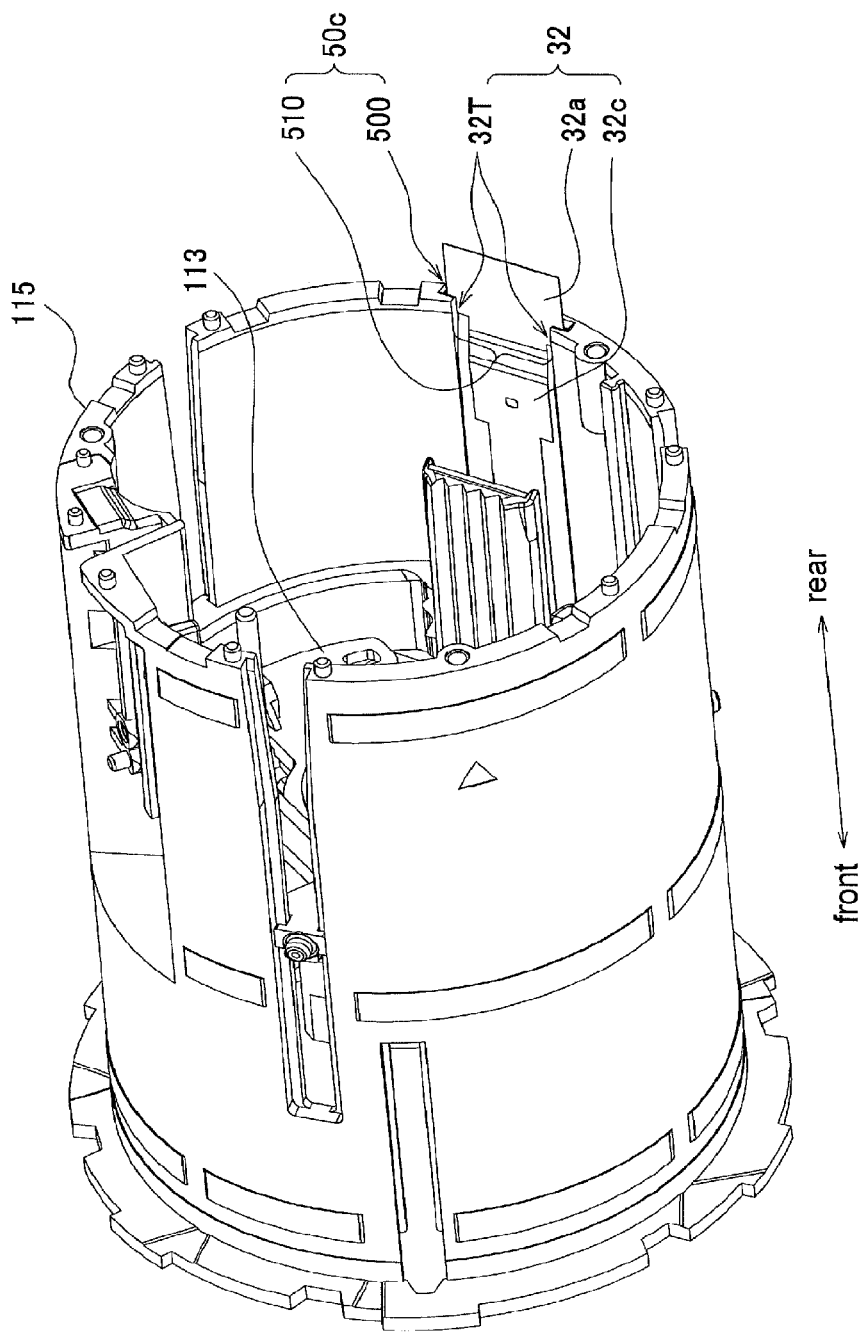
FIG. 12 is an oblique view illustrating a step of engaging an FPC with an engagement component.

Next, as shown in FIG. 12, the reinforcing plate 32a of the FPC 32 is inserted into the slit 500 of the engagement component 50c, and the linking component 32c of the FPC 32 is pulled inside the fixed frame 115 through the slit opening 510 of the engagement component 50c. Here, the pair of shoulders 32T of the reinforcing plate 32a are each held in a bent state by the first to fourth protrusions 501 to 504 on inside of the slit 500 (see FIG. 8).

Figure 13:
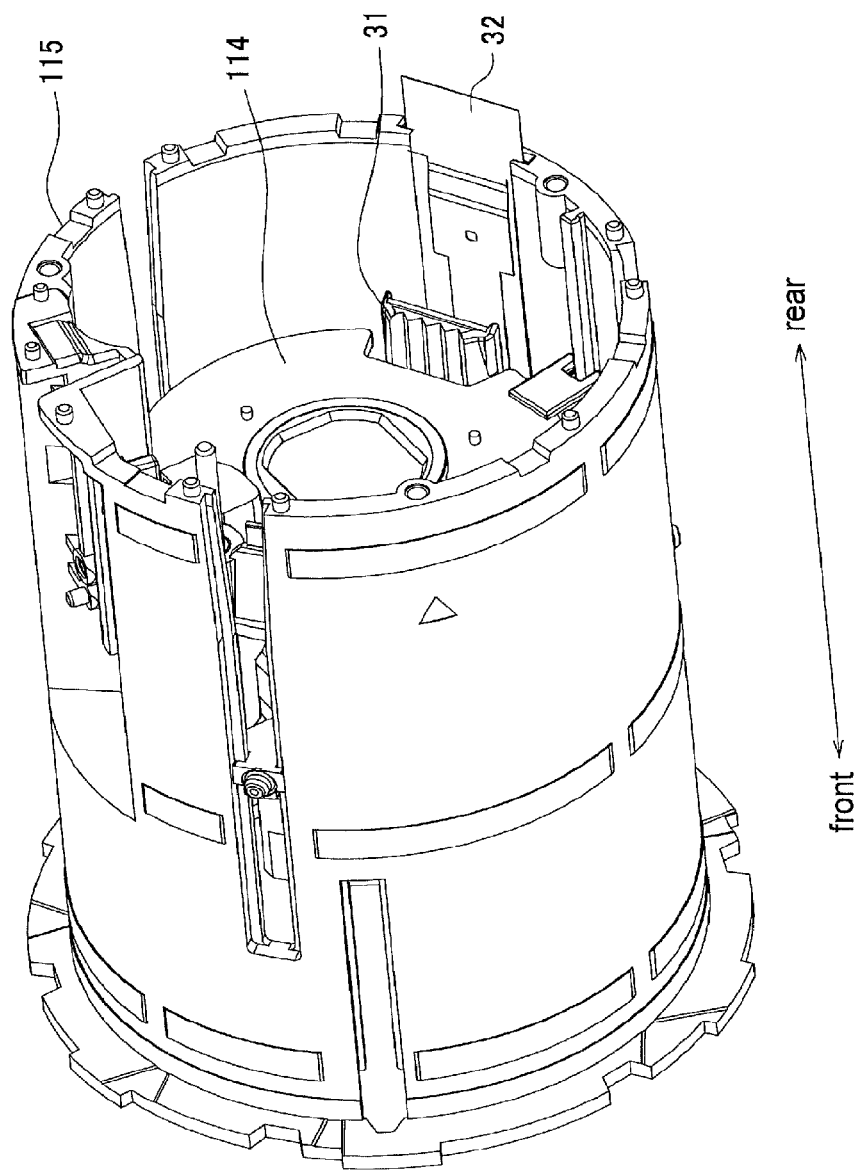
FIG. 13 is an oblique view illustrating a step of attaching a fourth movement frame to a fixed frame.

Next, as shown in FIG. 13, the fourth movement frame 114 is inserted into the interior of the fixed frame 115 from the rear of the fixed frame 115.

(2) Attachment of Monitor Unit 140 to Fixed Frame 115

Figure 14:
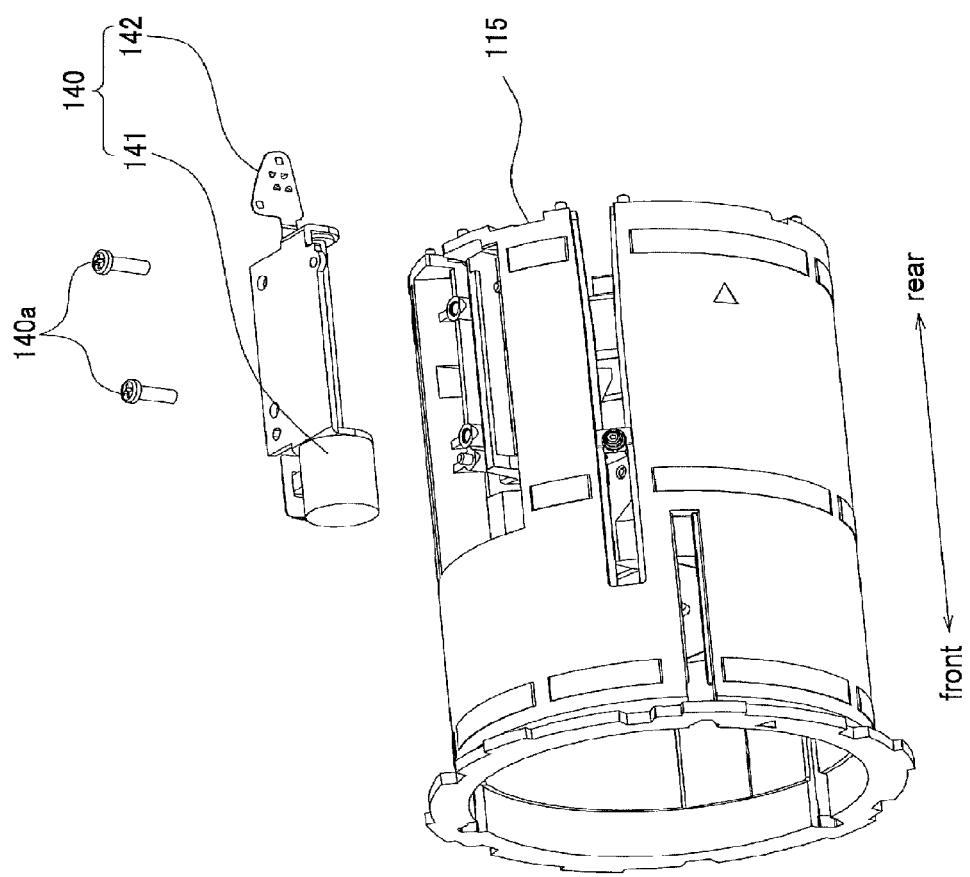
FIG. 14 is an oblique view illustrating a step of attaching a monitor unit to a fixed frame.
Figure 15:
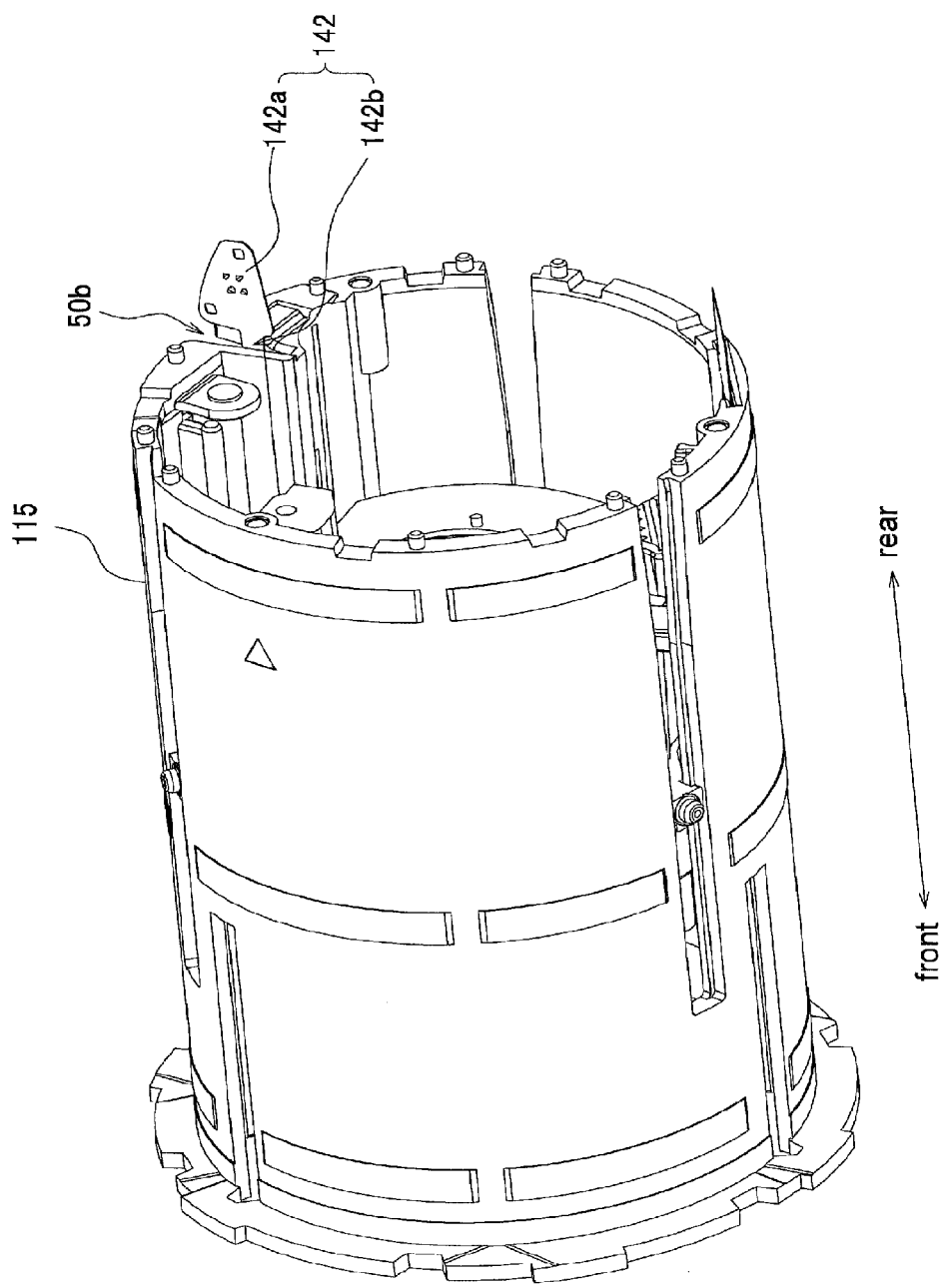
FIG. 15 is an oblique view illustrating a step of attaching a monitor unit to a fixed frame.

Next, as shown in FIG. 14, the monitor unit 140 is fixed to the side face of the fixed frame 115 with a pair of screws 140a. Here, as shown in FIG. 15, the communicating component 142b of the flexible substrate 142 is inserted into the cut-out 50b of the fixed frame 115, and the connection component 142a of the flexible substrate 142 is made to protrude to the rear of the fixed frame 115.

Figure 16:
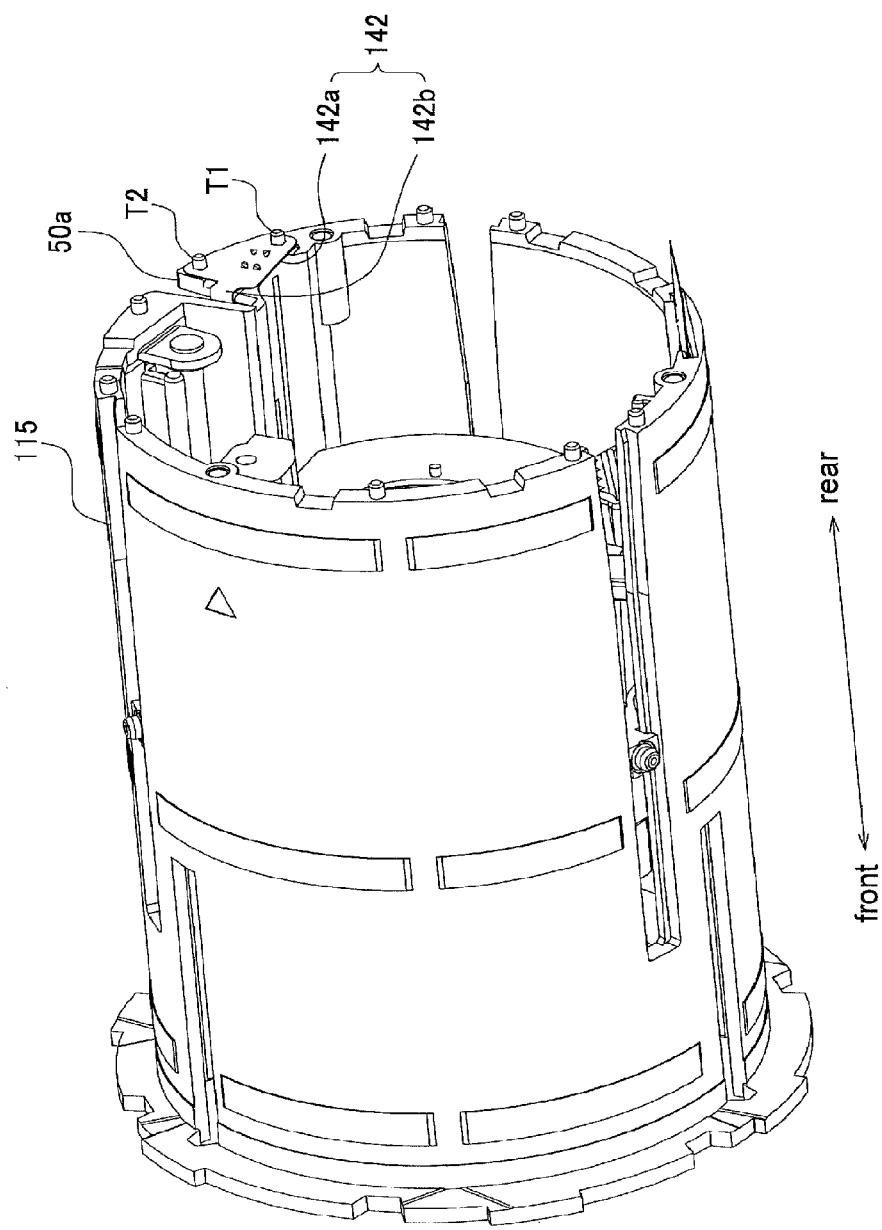
FIG. 16 is an oblique view illustrating a step of attaching a flexible substrate to first and second support bosses.

Next, as shown in FIG. 16, the flexible substrate 142 is bent at the communicating component 142b, and the first and second fitting holes S1 and S2 of the connection component 142a had by the flexible substrate 142 are fitted into the first and second support bosses T1 and T2 had by the support base 50a of the fixed frame 115. Consequently, the connection component 142a of the flexible substrate 142 is supported by the first and second support bosses T1 and T2 on the support base 50a.

(3) Attachment of Fixed Frame 115 to Rotary Barrel 116

Figure 17:
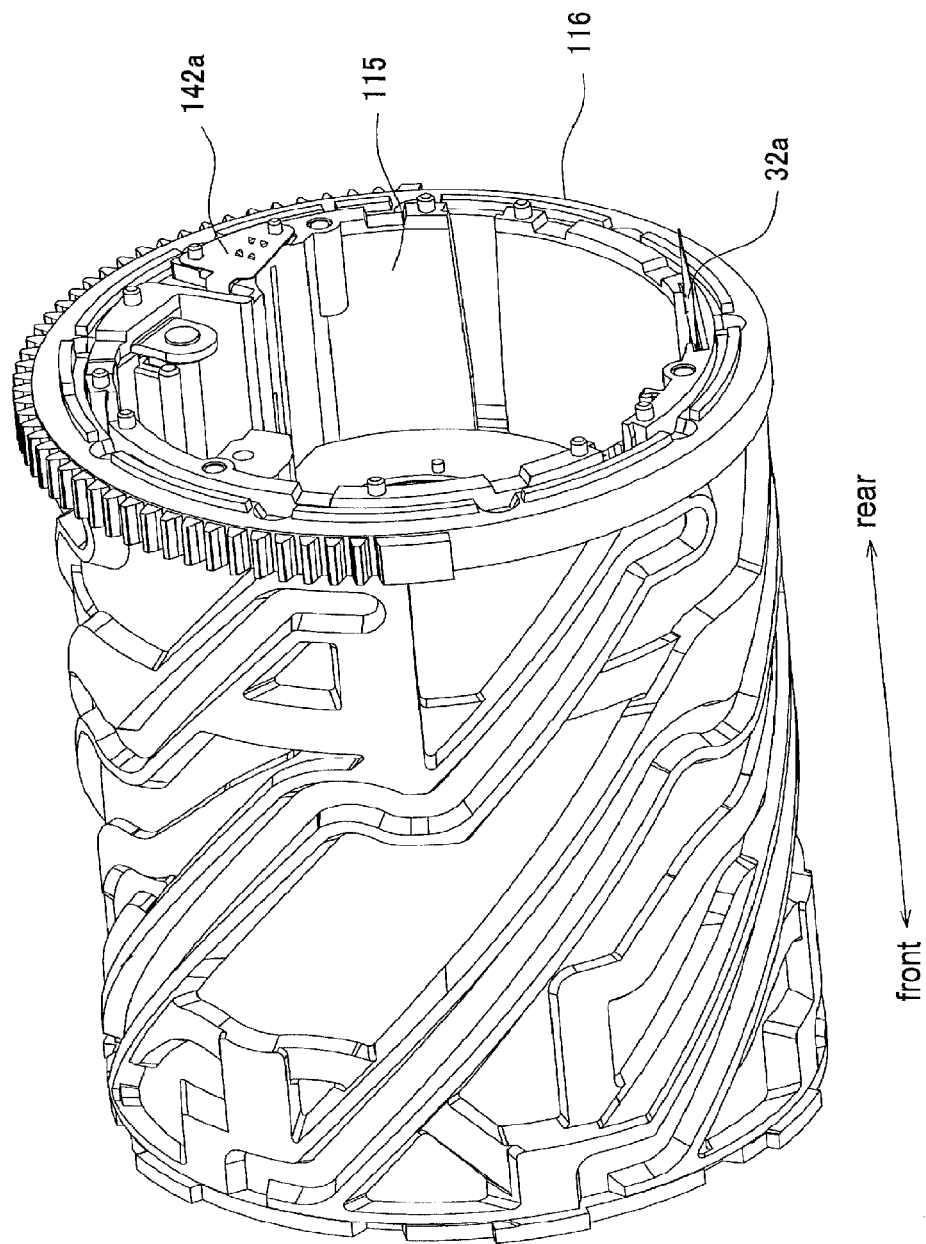
FIG. 17 is an oblique view illustrating a step of attaching a fixed frame to a rotary barrel.

Next, as shown in FIG. 17, the fixed frame 115 is inserted into the interior of the rotary barrel 116 from the front of the rotary barrel 116. Here, the reinforcing plate 32a of the third movement frame 113 protrudes to the rear of the rotary barrel 116, and the connection component 142a of the flexible substrate 142 is exposed from the rear end of the rotary barrel 116.

(4) Attachment of Base Member 120 to Fixed Frame 115

Figure 18:
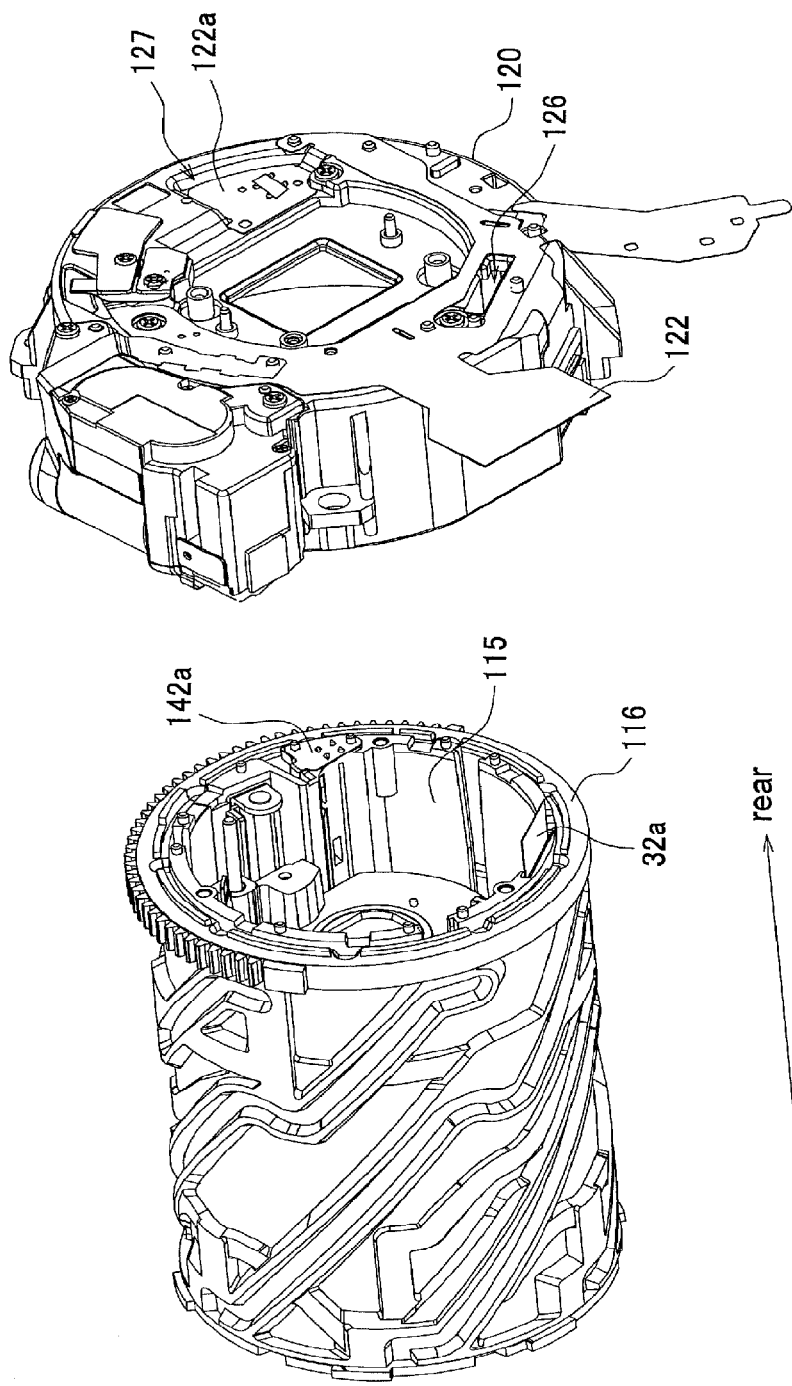
FIG. 18 is an oblique view illustrating a step of attaching a base member to a fixed frame.

Next, as shown in FIG. 18, the base member 120 is fitted into the rotary barrel 116 from the rear of the fixed frame 115. Here, the reinforcing plate 32a of the third movement frame 113 is inserted into the guide hole 126 of the base member 120, and the connection component 142a of the flexible substrate 142 is placed opposite the connected component 122a of the base substrate 122 had by the base member 120.

Figure 19:
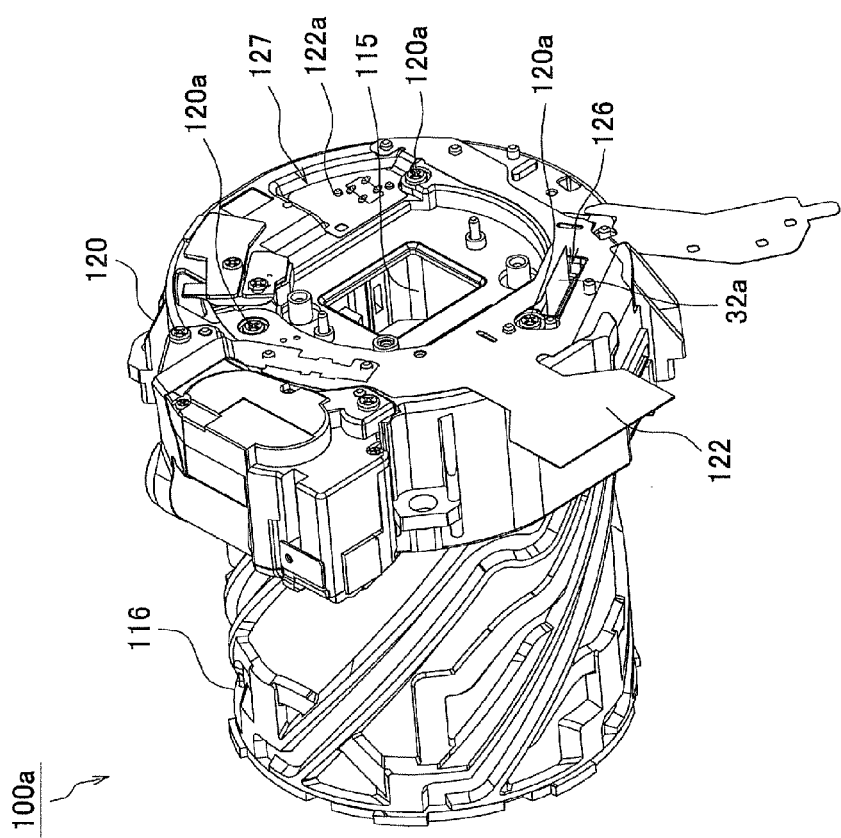
FIG. 19 is an oblique view illustrating a step of attaching a base member to a fixed frame.

Next, as shown in FIG. 19, the base member 120 is fixed to the fixed frame 115 by a plurality of screws 120a. This completes an assembly 110a. With the assembly 110a, the reinforcing plate 32a of the FPC 32 protrudes from the guide hole 126, and the connection component 142a of the flexible substrate 142 and the connected component 122a of the base substrate 122 are opposite each other on inside of the through-hole 127.

Figure 20:
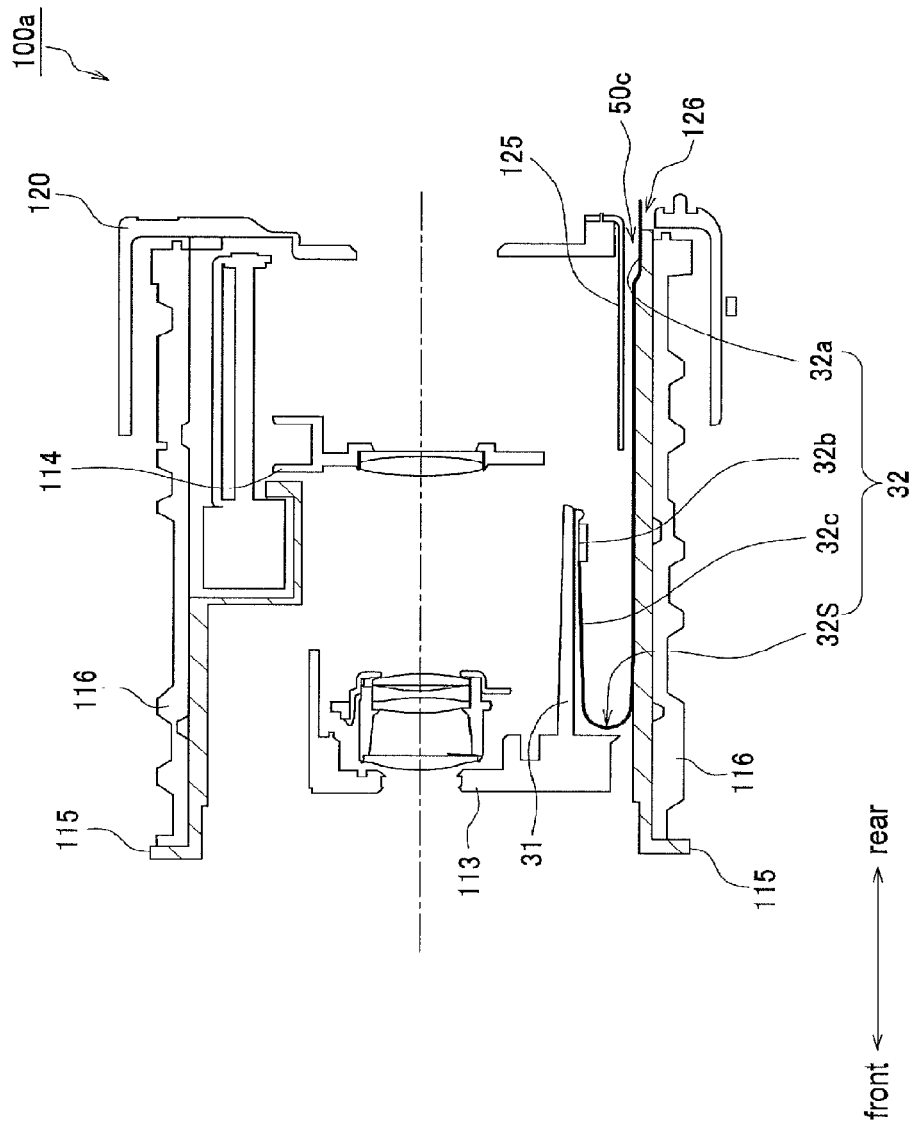
FIG. 20 is a cross section of an assembly.

FIG. 20 here is a cross section of an assembly 100a. As shown in FIG. 20, the FPC 32 is sandwiched between the third movement frame 113 and the fixed frame 115 in an overall state of being bent in a protruding shape toward the front. More specifically, the reinforcing plate 32a is engaged with the engagement component 50c of the fixed frame 115, and the fixed component 32b is fixed to the supporting wall 31 of the third movement frame 113. The linking component 32c is gently bent at the curved part 32S formed between the inner wall of the fixed frame 115 and the supporting wall 31 of the third movement frame 113. Also, the linking component 32c is sandwiched between the inner wall of the fixed frame 115 and the guide wall 125 of the base member 120 near the reinforcing plate 32a.

(5) Connection of FPC 32 to Base Substrate 122

Figure 21:
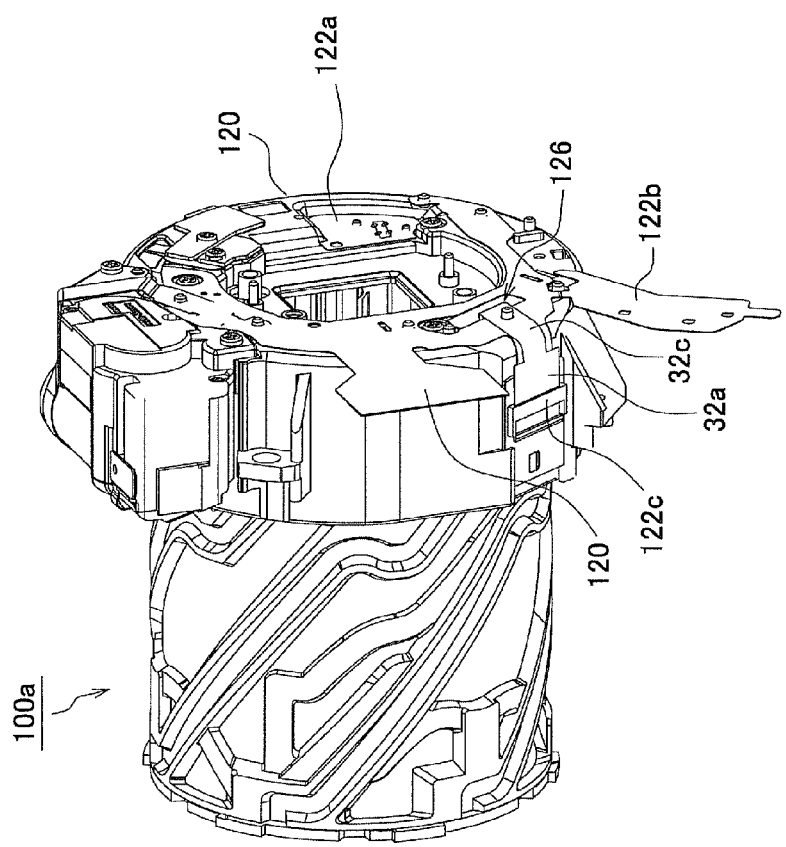
FIG. 21 is an oblique view illustrating a step of connecting an FPC to a base substrate.

Next, as shown in FIG. 21, the reinforcing plate 32a is pulled out of the guide hole 126 and inserted into the connector 122c of the base substrate 122. Consequently, the FPC 32 is mechanically and electrically connected to the base substrate 122.

Next, the guide hole 126 of the base member 120 is covered by the cover 122b of the base substrate 122.

Figure 22:
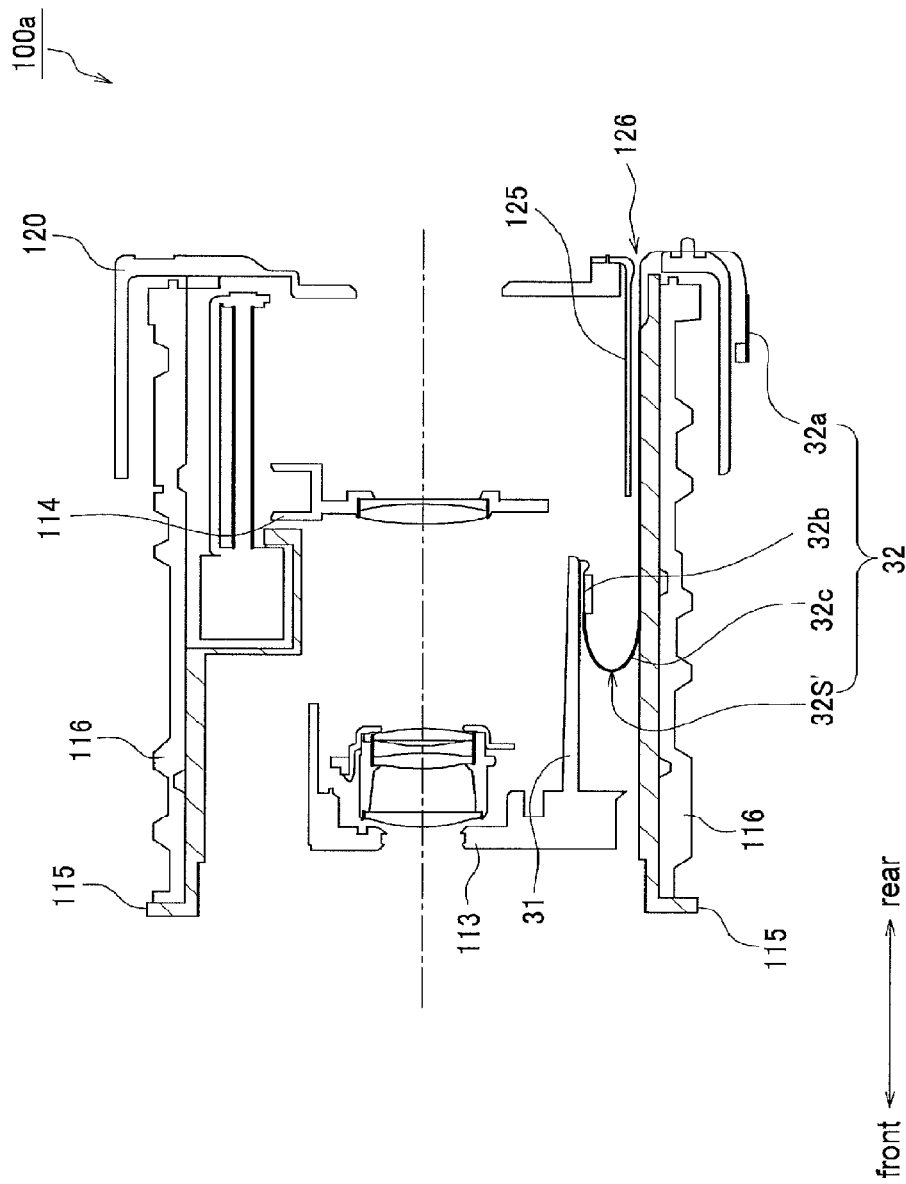
FIG. 22 is a cross section of an assembly.

FIG. 22 here is a cross section of the assembly 100a. As shown in FIG. 22, even after the reinforcing plate 32a has been pulled out of the guide hole 126, the linking component 32c is gently bent at the curved part 32S'. The curved part 32S' is positioned further to the rear than the curved part 32S (see FIG. 20), but is formed between the inner wall of the fixed frame 115 and the supporting wall 31 of the third movement frame 113, just as is the curved part 32S.

FIG. 22 corresponds to the telephoto zoom state of the completed lens barrel 100.

(6) Connection of Flexible Substrate 142 to Base Substrate 122

Figure 23:
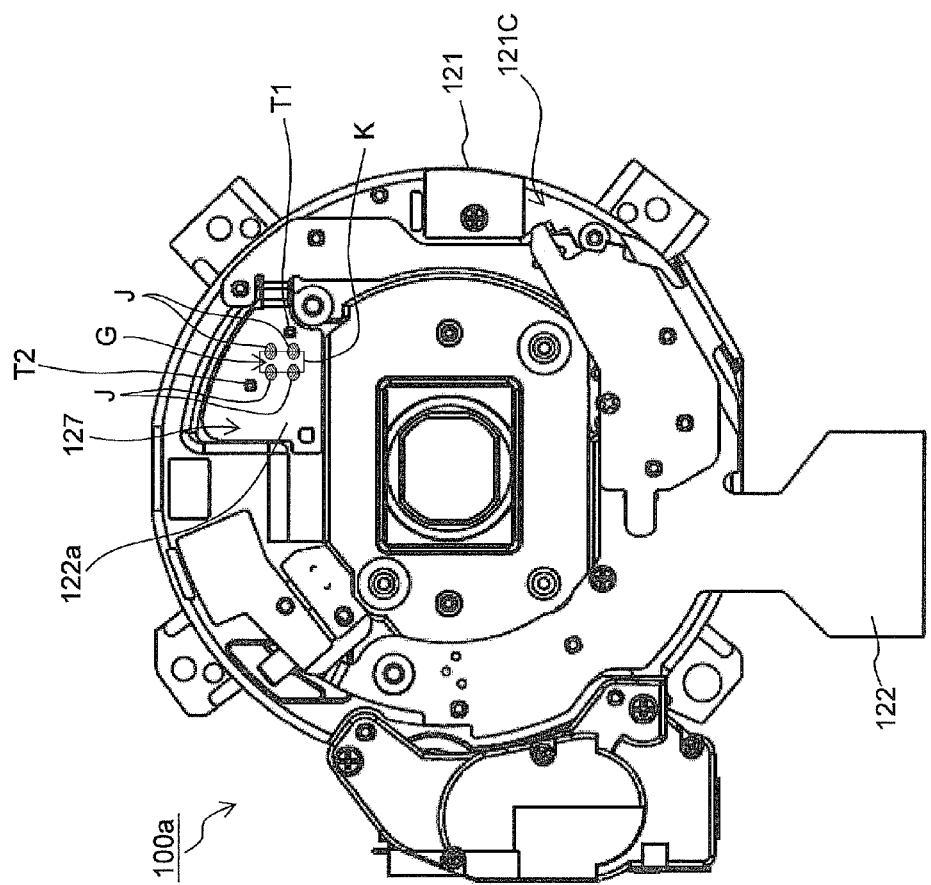
FIG. 23 is an oblique view illustrating a step of connecting a flexible substrate to a base substrate.

Next, as shown in FIG. 23, the four connection terminals G had by the connection component 142a of the flexible substrate 142 are exposed through the connection window K of the connected component 122a, and matched to the positions of the four connected terminals J had by the connected component 122a. Consequently, the electrically connected parts between the flexible substrate 142 and the base substrate 122 (that is, the connection terminals G and the connected terminals J) are located on inside of the through-hole 127 when viewed in the optical axis direction. In this embodiment, "when viewed in the optical axis direction" is defined as being the same as a plan view of the outer surface 121C.

Next, the connection terminals G are soldered to the connected terminals J. Consequently, the flexible substrate 142 is electrically and mechanically connected to the base substrate 122.

Figure 24:
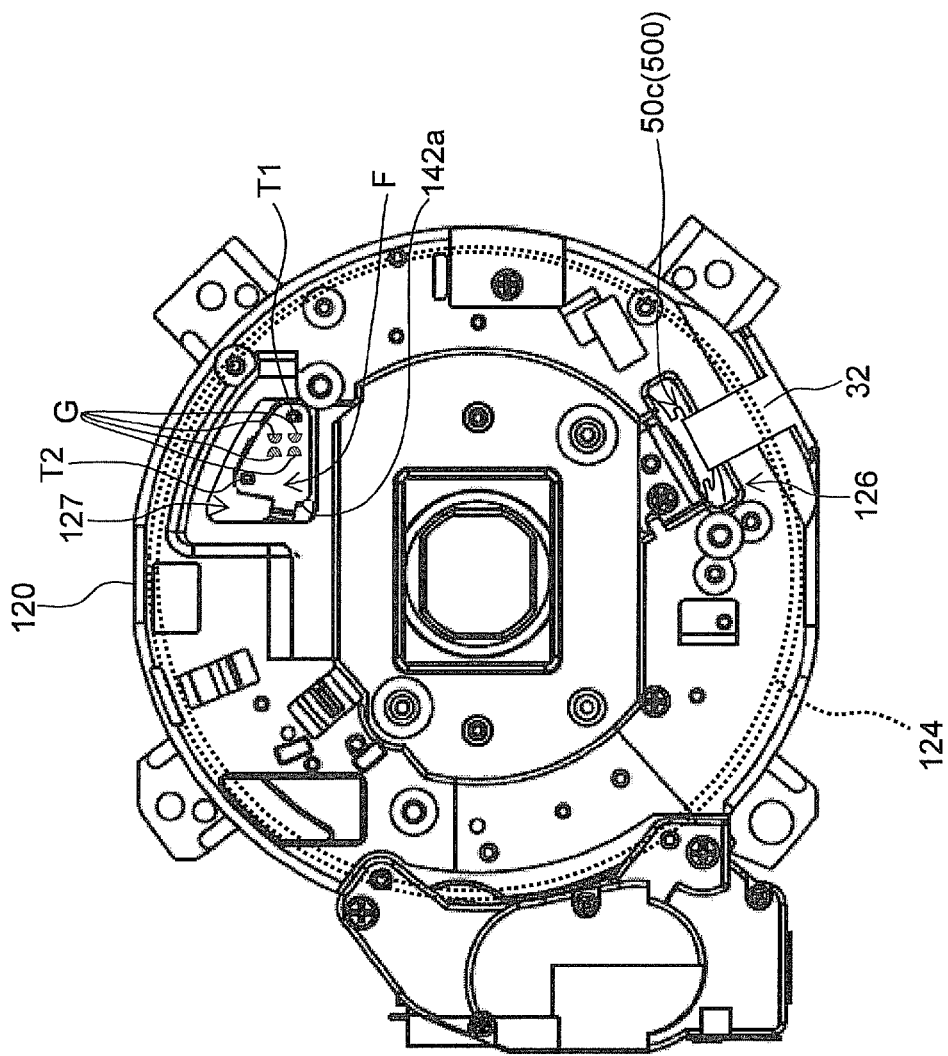
FIG. 24 is a plan view of a state in which a base substrate has been removed from the assembly shown in FIG. 23.

FIG. 24 here is a plan view of a state in which the base substrate 122 has been removed from the assembly 100a shown in FIG. 23. As shown in FIG. 24, the four connection terminals G are disposed on inside of the through-hole 127 when viewed in the optical axis direction. The first and second support bosses T1 and T2 that support the connection component 142a of the flexible substrate 142 are disposed on inside of the through-hole 127 when viewed in the optical axis direction. Also, substantially the entire connection face F of the connection component 142a is disposed on inside of the through-hole 127 when viewed in the optical axis direction.

Also, as shown in FIG. 24, the through-hole 127 is formed on inside of the ring spring 124 in a plan view of the outer surface 121C. Accordingly, the connection component 142a exposed on inside of the through-hole 127 is also disposed on inside of the ring spring 124.

Further, as shown in FIG. 24, the engagement component 50c (more specifically, the slit 500) is disposed on inside of the guide hole 126 when viewed in the optical axis direction. The guide hole 126 is formed on inside of the ring spring 124 in a plan view of the outer surface 121C, and the engagement component 50c is disposed on inside of the ring spring 124.

(7) Attachment of First Movement Frame 111 and Second Movement Frame 112 to Fixed Frame 115

Next, the second movement frame 112 is inserted into the interior of the fixed frame 115 from the front of the assembly 100a (see FIG. 3).

Next, the first movement frame 111 is fitted to the front end of the rotary barrel 116 from the front of the assembly 100a.

Figure 25:
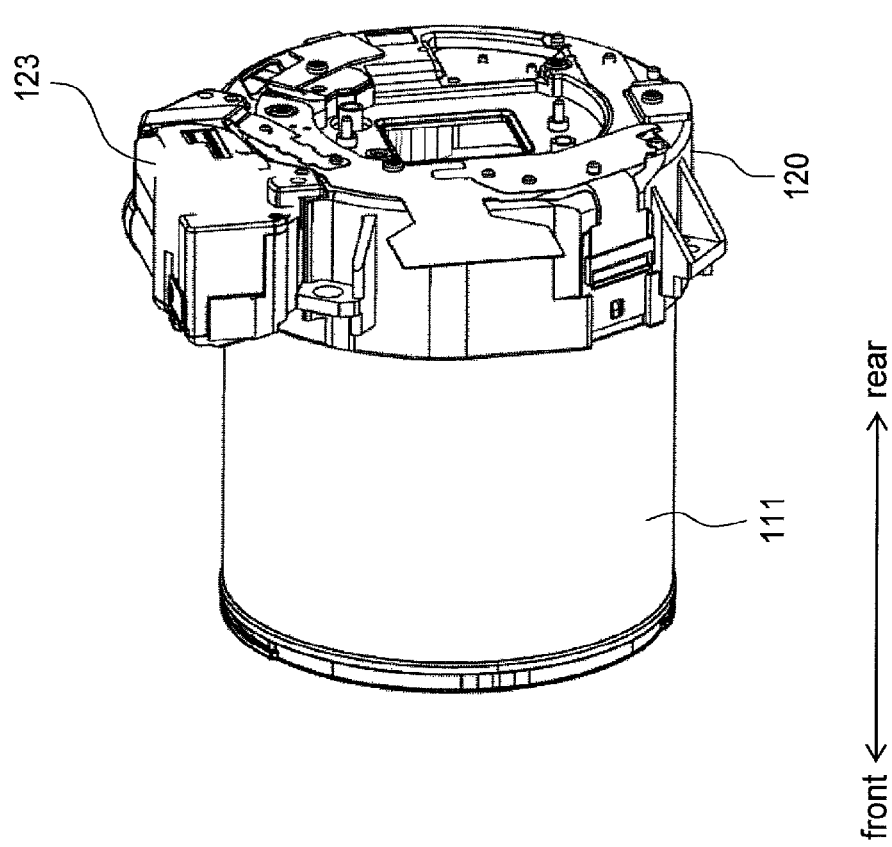
FIG. 25 is an oblique view illustrating a step of attaching a first movement frame and a second movement frame to a fixed frame.

Next, the rotary barrel 116 is rotationally driven by the DC motor 123, which telescopes the first movement frame 111, the second movement frame 112, and the third movement frame 113 as shown in FIG. 25.

After this, the imaging element unit 130 (not shown) is fixed to the rear side of the base member 120, which completes the assembly of the lens barrel 100.

Figure 26:
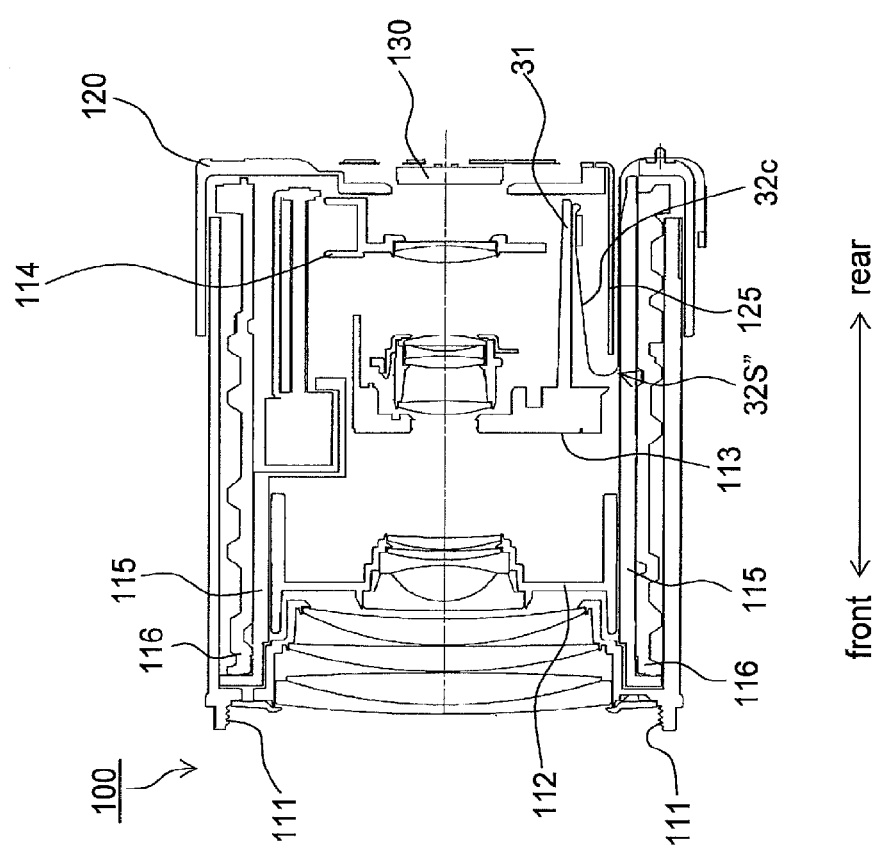
FIG. 26 is a cross section of a lens barrel in a telescoped state.

FIG. 26 here is a cross section of the lens barrel 100 in its telescoped state. As shown in FIG. 26, even in the telescoped state, the linking component 32c of the FPC 32 is gently bent at a curved part 32S". The curved part 32S" is located further to the rear than the curved part 32S' (see FIG. 22), but is formed between the inner wall of the fixed frame 115 and the supporting wall 31 of the third movement frame 113, just as is the curved part 32S'. Also, part of the linking component 32c is sandwiched between the inner wall of the fixed frame 115 and the guide wall 125 of the base member 120. Thus, the FPC 32 is gently bent only once, and is not bent over itself or twisted.

Action and Effects (1) With the lens barrel 100 pertaining to this embodiment, the flexible substrate 142 has the four connection terminals G (an example of a "connection terminal"). The base member 120 (an example of a "cover member") has the through-hole 127 (an example of a "through-hole") formed in the optical axis direction (an example of a "specific direction"). The four connection terminals G are located on inside of the through-hole 127 when viewed in the optical axis direction.

Therefore, the four connection terminals G can be easily accessed via the through-hole 127, so the flexible substrate 142 and the base substrate 122 can be simply electrically connected without having to pass the flexible substrate 142 through the through-hole 127 in the step of assembling the lens barrel 100. As a result, work efficiency can be improved in the step of assembling the lens barrel 100.

(2) The four connection terminals G are formed on the connection component 142a (an example of "one end") of the flexible substrate 142. The lens housing 110 has the first and second support bosses T1 and T2 (an example of a "support component") that support the connection component 142a.

Therefore, since it is supported by the first and second support bosses T1 and T2, when the base member 120 is attached to the fixed frame 115, the end of the flexible substrate 142 is less apt to be erroneously sandwiched between the base member 120 and the fixed frame 115 and rotary barrel 116.

(3) The connected component 122a of the base substrate 122 substantially covers the through-hole 127. Therefore, this helps prevent dirt and so forth from working its way into the interior of the lens housing 110 through the through-hole 127.

(4) The base member 120 has the ring spring 124 disposed on the inner bottom face 121A (an example of an "opposing face") that is opposite the lens housing 110. The through-hole 127 is formed on inside of the ring spring 124 in a plan view of the inner bottom face 121A.

Thus, the flexible substrate 142 is not sandwiched between the lens housing 110 and the ring spring 124. Therefore, while the lens barrel 100 is being used, the flexible substrate 142 is less apt to be damaged by friction between the lens housing 110 and the ring spring 124.

(5) Also, with the lens barrel 100 pertaining to this embodiment, the fixed frame 115 has the engagement component 50c formed at the rear end face 50S that is opposite the base member 120. The base member 120 has the guide hole 126 into which the FPC 32 is inserted. The engagement component 50c is located on inside of the guide hole 126 when viewed in the optical axis direction.

Therefore, the FPC 32 engaged in the engagement component 50c can be easily inserted into the guide hole 126, so the FPC 32 can be simply pulled out of the guide hole 126.

Also, since the base member 120 can be attached to the fixed frame 115 in a state in which the FPC 32 is engaged with the engagement component 50c, the FPC 32 is less able to be erroneously sandwiched between the base member 120 and the fixed frame 115 and rotary barrel 116.

(6) The engagement component 50c is the slit 500 formed in the rear end face 50S.

Therefore, after the base member 120 has been attached to the fixed frame 115, the engagement of the FPC 32 by the engagement component 50c can be easily released.

(7) The engagement component 50c has the first to fourth protrusions 501 to 504 that protrude to the inside of the slit 500.

Therefore, when the reinforcing plate 32a of the FPC 32 has been inserted into the slit 500, the first to fourth protrusions 501 to 504 hit the reinforcing plate 32a, and the frictional force thus produced allows the reinforcing plate 32a to be securely supported.

(8) The first protrusion 501 is disposed diagonally across from the second protrusion 502, and the third protrusion 503 is disposed diagonally across from the fourth protrusion 504.

Therefore, the FPC 32 can be bent by the first and second protrusions 501 and 502 and by the third and fourth protrusions 503 and 504. Accordingly, creasing of the FPC 32 is suppressed, so the FPC 32 can be inserted more accurately into the guide hole 126.

(9) The base member 120 has the guide wall 125 erected on the inner bottom face of the cover main body 121. The linking component 32c of the FPC 32 is sandwiched between the inner wall of the fixed frame 115 and the guide wall 125 near the reinforcing plate 32a.

Therefore, whether the lens housing 110 is in its telescoped state or in its telephoto zoom state, the FPC 32 is not bent over itself or twisted.

Other Embodiments

The above embodiment was given as an example of an embodiment of the present invention. But the present invention is not limited by this. Other embodiments will therefore be compiled and described below. Nor is the present invention limited to or by these other embodiments, and can be applied to embodiments that have been suitably modified.

(1) The first and second support bosses T1 and T2 are an example of a support component that supports the flexible substrate 142. This support component that supports the flexible substrate 142 may be any support structure, such as a magnet or tape that affixes the flexible substrate 142, a slit that engages with the flexible substrate 142, or the like.

(2) The flexible substrate 142 may be connected to any electronic part included in the interior of the lens housing 110. For instance, it may be connected to a motor or the like, or may be connected to a circuit board.

(3) The through-hole 127 may pass through the cover main body 121 in the optical axis direction, or may pass through the cover main body 121 in some other direction.

(4) The electrical connection between the flexible substrate 142 and the base substrate 122 need not be connection by soldering, and may be any kind of connection such as connection using a connector, or the like.

(5) The optical system L may be one in which the optical axis is bent by a bending optical system such as a prism or a mirror. In this case, the lens housing 110 may be bent along the optical axis.

(6) The engagement component 50c was said to have the slit 500 for inserting the FPC 32, but this is not the only option. The engagement component 50c may, for example, be any support structure such as a magnet or tape that affixes the FPC 32, a protrusion that is fitted into the FPC 32, or the like. Also, the engagement component 50c may be provided to a member other than the fixed frame 115, such as the third movement frame 113, the fourth movement frame 114, or the rotary barrel 116.

(7) The FPC 32 was said to have the reinforcing plate 32a, but this is not the only option. The FPC 32 may have no reinforcing plate 32a, and may be made of a material that is highly pliant overall. Here again, the FPC 32 can be raised up toward the base member 120 by bending the FPC 32 with the first to fourth protrusions 501 to 504 that protrude into the slit 500.

(8) The engagement component 50c bent the FPC 32 with the first to fourth protrusions 501 to 504 that protruded into the slit 500, but this is not the only option. For example, the FPC 32 may be bent by forming the slit 500 itself in an arc shape.

(9) The FPC 32 was engaged with the engagement component 50c by being inserted into the slit 500, but this is not the only option. The engagement component 50c may be any support structure, such as a magnet or tape that affixes the FPC 32, a cut-out into which the side end of the FPC 32 is meshed, or the like.

(10) The flexible substrate 111 may be connected to any electronic part that is included in the interior of the lens housing 110. For example, it may be connected to a detecting element, a motor, or the like, or may be connected to a circuit board.

(11) The external shape of the lens housing 110 is not limited to being cylindrical, and may be cuboid or some other shape. Also, the lens housing 110 opened in the optical axis direction, but may instead open in a direction perpendicular to the optical axis.

(12) The second movement frame 112 was pliant, but need not be pliant.

(13) The flexible substrate 142 was attached to the fixed frame 115 that was fixed to the base member 120, but this is not the only option. The flexible substrate 142 may be attached to a member that is capable of relative movement with respect to the base member 120. Examples of such a member include the first movement frame 111, the second movement frame 112, the third movement frame 113, the fourth movement frame 114, and the rotary barrel 116.

(14) The four connection terminals G were disposed in the interior of the lens housing 110, and could be accessed via the through-hole 127, but this is not the only option.

For example, the connection terminals G may be disposed so that they protrude outside the lens housing 110 from the through-hole 127. Also, the connection component 142a of the flexible substrate 142, the engagement component support base 50a of the fixed frame 115, or the like may also protrude from the through-hole 127. In this case, if the gap between the support base 50a and the through-hole 127 is made smaller, this will help prevent dirt or the like from working its way into the interior of the lens housing 110 through the through-hole 127.

However, it is preferable for the four connection terminals G to be disposed in the interior of the lens housing 110 as in the above embodiment. This is because it is simpler to reduce the gap between the connected component 122a and the through-hole 127 and thereby prevent dirt or the like from working its way into the interior of the lens housing 110 through the through-hole 127.

Figure 27:
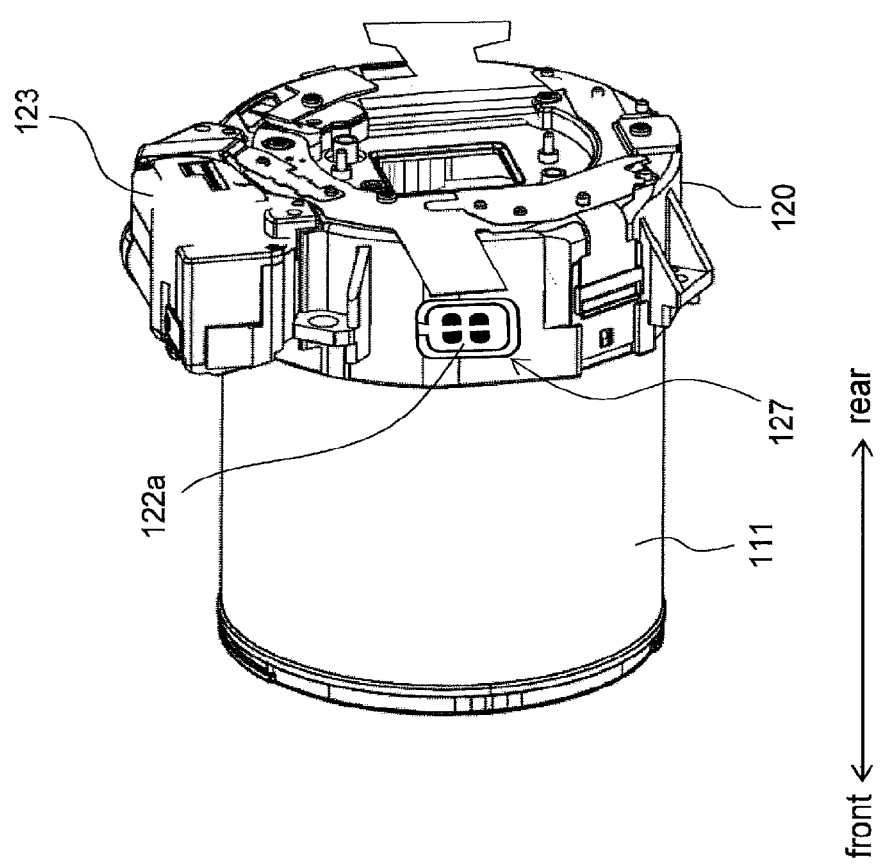
FIG. 27 is an oblique view of another configuration of a through-hole 127.

(15) The through-hole 127 passed through the cover main body 121 from the inner bottom face 121A all the way to the outer surface 121C in the optical axis direction, but this is not the only option. For instance, as shown in FIG. 27, the through-hole 127 may pass through the cover main body 121 from the outer peripheral face 121D to the inner peripheral face 121B. In this case, the through-hole 127 is formed in a direction that intersects (is perpendicular to) the optical axis direction.

(16) The connection component 142a including the four connection terminals G constituted the rear end of the flexible substrate 142, but this is not the only option. The position of the connection component 142a on the flexible substrate 142 can be changed as desired.

What is claimed is:

1. A lens barrel, comprising:
    an optical system configured to form an optical image of a subject;
    a housing supporting the optical system in an interior thereof;
    a cover member supporting the housing in a state of covering an opening of the housing;
    an electronic part provided in the interior of the housing; and
    a flexible substrate electrically connected to the electronic part,
    the flexible substrate having a connection terminal,
    the cover member having a through-hole formed in a specific direction, and
    the connection terminal being positioned on inside of the through-hole when viewed in the specific direction.

2. The lens barrel according to claim 1, wherein
    the connection terminal is formed at one end of the flexible substrate, and
    the housing has a support component that supports the one end of the flexible substrate.

3. The lens barrel according to claim 1, wherein
    the connection terminal is formed on a connection face of the flexible substrate, and
    the connection face is positioned on inside of the through-hole when viewed in the specific direction.

4. The lens barrel according to claim 1, further comprising:
    a base substrate disposed opposite to the housing with the cover member in between as a reference, and the base substrate being electrically connected to the connection terminal.

5. The lens barrel according to claim 4, wherein
    the base substrate has a connected terminal that is electrically connected to the connection terminal, and
    the connected terminal is positioned on inside of the through-hole when viewed in the specific direction.

6. The lens barrel according to claim 5, wherein
    the base substrate covers the through-hole.

7. The lens barrel according to claim 4, wherein
    the base substrate is a pliant flexible substrate.

8. The lens barrel according to claim 1, wherein
    the cover member is a base member that supports the housing.

9. The lens barrel according to claim 8, wherein
    the base member supports an imaging element.

10. The lens barrel according to claim 1, wherein
    the cover member has a ring spring disposed on an opposing face that is opposite to the housing, and
    the through-hole is formed on inside of the ring spring when seen in plan view of the opposing face.

* * * * *